US011073185B2

(12) United States Patent
Ryuzaki et al.

(10) Patent No.: US 11,073,185 B2
(45) Date of Patent: Jul. 27, 2021

(54) GEAR-POSITION LEARNING DEVICE FOR AUTOMATIC CLUTCH TRANSMISSION

(71) Applicant: HONDA MOTOR CO., LTD., Tokyo (JP)

(72) Inventors: Tatsuya Ryuzaki, Wako (JP); Junya Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/646,162

(22) PCT Filed: Jun. 14, 2018

(86) PCT No.: PCT/JP2018/022738
§ 371 (c)(1),
(2) Date: Mar. 11, 2020

(87) PCT Pub. No.: WO2019/053978
PCT Pub. Date: Mar. 21, 2019

(65) Prior Publication Data
US 2020/0271174 A1  Aug. 27, 2020

(30) Foreign Application Priority Data

Sep. 15, 2017 (JP) .............................. JP2017-177699

(51) Int. Cl.
F16D 48/06 (2006.01)
F16D 25/06 (2006.01)
(Continued)

(52) U.S. Cl.
CPC .......... F16D 48/068 (2013.01); F16D 25/06 (2013.01); F16H 63/18 (2013.01); F16H 63/46 (2013.01);
(Continued)

(58) Field of Classification Search
None
See application file for complete search history.

(56) References Cited

U.S. PATENT DOCUMENTS 6,453,762 B1   9/2002 Nishikawa et al.
2004/0139795 A1  7/2004 Kawakubo et al.
(Continued)

FOREIGN PATENT DOCUMENTS

EP   1826442   8/2007
EP   2708779   3/2014
(Continued)

OTHER PUBLICATIONS

International Search Report and Written Opinion for International Application No. PCT/JP2018/022738 dated Sep. 18, 2018, 7 pages.
(Continued)

Primary Examiner — Timothy Hannon
(74) Attorney, Agent, or Firm — Amin, Turocy & Watson, LLP

(57) ABSTRACT

A gear-position learning device for an automatic clutch transmission includes a transmission configured to be shifted by an operation of a driver of a vehicle, a clutch device disposed in a transmission path between the transmission and an engine and configured to be connected and disconnected by actuation of a clutch actuator, a controller configured to control connection and disconnection of the clutch device performed by the clutch actuator, a shift drum configured to rotate according to a shift operation that the driver performs on a shift operator and switch the shift stage of the transmission, and a rotational position defining mechanism configured to define a rotational position of the shift drum, wherein the controller has a learning mode for learning a rotation angle of the shift drum and is configured to control connection and disconnection of the clutch device during the learning mode such that the shift drum is at a rotational (Continued)

position determined by the rotational position defining mechanism.

10 Claims, 11 Drawing Sheets

(51) Int. Cl.
    *F16H 63/18*     (2006.01)
    *F16H 63/46*     (2006.01)

(52) U.S. Cl.
    CPC ........... *F16D 2500/1026* (2013.01); *F16D 2500/1083* (2013.01); *F16D 2500/10412* (2013.01); *F16D 2500/308* (2013.01); *F16D 2500/30808* (2013.01); *F16D 2500/31406* (2013.01); *F16D 2500/5012* (2013.01); *F16D 2500/70406* (2013.01); *F16H 2342/02* (2013.01)

(56) References Cited

U.S. PATENT DOCUMENTS

| | | |
|---|---|---|
| 2006/0065068 A1 | 3/2006 | Mizuno et al. |
| 2016/0091089 A1 | 3/2016 | Nakamura et al. |
| 2016/0288879 A1 | 10/2016 | Ono et al. |

FOREIGN PATENT DOCUMENTS

| | | |
|---|---|---|
| JP | 2001-124203 | 5/2001 |
| JP | 2004-203313 | 7/2004 |
| JP | 2006-097702 | 4/2006 |
| JP | 2009-275760 | 11/2009 |
| JP | 2012-177392 | 9/2012 |
| JP | 2014-059003 | 4/2014 |
| JP | 2016-070357 | 5/2016 |
| WO | 2009/090612 | 7/2009 |
| WO | 2014/196318 | 12/2014 |
| WO | 2016/157390 | 10/2016 |

OTHER PUBLICATIONS

Extended European Search Report for European Patent Application No. 18856974.3 dated May 13, 2020.

GEAR-POSITION LEARNING DEVICE FOR AUTOMATIC CLUTCH TRANSMISSION

TECHNICAL FIELD

The present invention relates to a gear-position learning device for an automatic clutch transmission.

Priority is claimed on Japanese Patent Application No. 2017-177699, filed Sep. 15, 2017, the content of which is incorporated herein by reference.

BACKGROUND ART

A gear position detection device that learns a neutral position of a transmission upon receiving a learning permission command to permit learning of the neutral position (transmitted by pressing a predetermined button twice or the like) is known in the related art (for example, see Patent Literature 1).

CITATION LIST

Patent Literature

[Patent Literature 1]
Japanese Unexamined Patent Application, First Publication No. 2012-177392

SUMMARY OF INVENTION

Technical Problem

The above related art describes gear position learning of a manual clutch type transmission and does not describe automatic clutch control during gear position learning.

The related art also suggests that various electric controls are performed according to the gear position of the transmission but provides no description about accurately learning the rotation angle of a shift drum when the transmission is in gear.

Aspects according to the present invention have been made in view of such circumstances and it is an object of the aspects of the present invention to provide a gear-position learning device for an automatic clutch transmission which can perform highly accurate in-gear position learning.

Solution to Problem

To solve the above problem, the present invention adopts the following aspects.

(1) A gear-position learning device for an automatic clutch transmission according to an aspect of the present invention includes a transmission (21) configured to be shifted by an operation of a driver of a vehicle (1), a clutch device (26) disposed in a transmission path between the transmission (21) and an engine (13) and configured to be connected and disconnected by actuation of a clutch actuator (50), a controller (60) configured to control connection and disconnection of the clutch device (26) performed by the clutch actuator (50), a shift drum (36) configured to rotate according to a shift operation that the driver performs on a shift operator (32) and switch the shift stage of the transmission (21), and a rotational position defining mechanism (39K) configured to define a rotational position of the shift drum (36), wherein the controller (60) has a learning mode for learning a rotation angle of the shift drum (36) and is configured to control connection and disconnection of the clutch device (26) during the learning mode such that the shift drum (36) is at a rotational position determined by the rotational position defining mechanism (39K).

(2) In the above aspect (1), the clutch device (26) may be a hydraulic clutch configured to be brought into a connected state when hydraulic pressure is supplied thereto, the rotational position defining mechanism (39K) may include a shift drum plate (38) configured to be rotatable coaxially and integrally with the shift drum (36) and having on an outer periphery thereof a plurality of valley bottoms (38b) that define rotational positions of the shift drum (36), and a stopper (39b) supported by a transmission case (17) that supports the shift drum (36) and configured to engage with the valley bottom (38b) of the shift drum plate (38) in a biased state to define a rotational position of the shift drum (36), wherein the controller (60) is configured to reduce a hydraulic pressure of the clutch device (26) when the stopper (39b) has passed over a top portion (38d) between adjacent valley bottoms (38b) such that the stopper (39b) is positioned at the valley bottom (38b) of the shift drum plate (38) and learn the rotation angle of the shift drum (36) in a state where the shift drum (36) is at the rotational position determined by the rotational position defining mechanism (39K) during the learning mode.

(3) In the above aspect (2), the controller (60) may be configured to set the hydraulic pressure of the clutch device (26) to be less than or less than or equal to a predetermined first hydraulic pressure value (PS1) when the stopper (39b) moves from the top portion (38d) of the shift drum plate (38) toward the valley bottom (38b) during the learning mode.

(4) In the above aspect (3), the controller (60) may be configured to permit learning of the rotation angle of the shift drum (36) when the hydraulic pressure of the clutch device (26) is set to be less than or less than or equal to the first hydraulic pressure value (PS1) during the learning mode.

(5) In any one of the above aspects (2) to (4), the controller (60) may be configured to set the hydraulic pressure of the clutch device (26) to a value that is more than or equal to or more than a predetermined second hydraulic pressure value (PS2) when the stopper (39b) moves from the valley bottom (38b) to the top portion (38d) of the shift drum plate (38) during the learning mode.

(6) In the above aspect (5), the controller (60) may be configured to maintain a state where the hydraulic pressure of the clutch device (26) is set to a value that is more than or equal to or more than the second hydraulic pressure value (PS2) until the stopper (39b) passes over the top portion (38d) of the shift drum plate (38) during the learning mode.

(7) In any one of the above aspects (1) to (6), the gear-position learning device may further include a master arm (31a) connected to the shift operator (32) and configured to move from a neutral position (D1) and rotate the shift drum (36) by a shift operation performed on the shift operator (32), wherein the controller (60) is configured to permit learning of the rotation angle of the shift drum (36) upon detecting that the master arm (31a) is in the neutral position (D1) during the learning mode.

(8) In any one of the above aspects (1) to (7), the controller (60) may be configured to permit learning of the rotation angle of the shift drum (36) when the rotation angle of the shift drum (36) is within a predetermined range during the learning mode.

(9) In any one of the above aspects (1) to (8), the gear-position learning device may further include a gear position sensor (41) configured to detect a gear position from the rotational position of the shift drum (36), wherein the controller (60) is configured to permit learning of the rotation angle of the shift drum (36) when the gear position detected by the gear position sensor (41) matches a predetermined target gear position during the learning mode.

(10) In any one of the above aspects (1) to (9), the gear-position learning device may further include a changeover switch (59) configured to switch the controller (60) from a normal mode to the learning mode.

Advantageous Effects of Invention

According to the above aspect (1), the rotation angle of the shift drum mechanically determined by the rotational position defining mechanism during the learning mode for learning the rotation angle of the shift drum for switching the shift stage can be stored. That is, in the learning mode, connection and disconnection of the clutch device is controlled and the clutch device is disconnected after avoiding, for example, a dog hit occurring in the transmission, whereby the rotational position of the shift drum can be mechanically determined by the rotational position defining mechanism. Therefore, highly accurate in-gear position learning can be performed.

In the case of the above aspect (2), in the learning mode, the clutch device is brought into a disconnected state when the stopper has passed over the top portion between adjacent valley bottoms of the shift drum plate, whereby the rotational position of the shift drum can be mechanically determined by the rotational position defining mechanism. Therefore, the stopper is automatically guided to the valley bottom of the shift drum plate, such that highly accurate in-gear position learning can be performed.

In the case of the above aspect (3), by making a clutch hydraulic pressure to correspond to the disconnected state, the shift drum plate is rotated to guide the stopper to the valley bottom position only by the bias force of the stopper, such that highly accurate in-gear position learning can be performed.

In the case of the above aspect (4), highly accurate in-gear position learning can be performed in a state where the shift drum plate is rotated to guide the stopper to the valley bottom position only by the bias force of the stopper.

In the case of the above aspect (5), the torque of the engine is slightly transmitted to the transmission with a clutch hydraulic pressure corresponding to a weakly connected state, such that control for avoiding a dog hit occurring in the transmission can be performed.

In the case of the above aspect (6), it is possible to reliably perform control for avoiding a dog hit occurring in the transmission.

In the case of the above aspect (7), when the master arm is moved from the neutral position by an external force applied to the shift operator, the master arm may cause a deviation in the position of the shift drum. However, it is possible to ensure that the shift arm does not cause a deviation in the position of the shift drum by permitting learning of the rotation angle of the shift drum when the shift arm is at the neutral position, such that highly accurate in-gear position learning can be performed.

In the case of the above aspect (8), if the rotation angle of the shift drum plate deviates beyond the predetermined range, a dog hit of the transmission or the like may occur and therefore learning of the rotation angle of the shift drum is not permitted, such that highly accurate in-gear position learning can be performed.

In the case of the above aspect (9), if the current gear position detected by the gear position sensor does not match the target gear position predetermined in the controller, learning of the rotation angle of the shift drum is not permitted to prevent erroneous learning. As a result, highly accurate in-gear position learning can be performed.

In the case of the above aspect (10), learning of the rotation angle of the shift drum is based on the premise that corresponding work is performed in a factory, a store, and the like. Therefore, by allowing the learning mode to be switched by operating the changeover switch only during learning, it is possible to prevent erroneous operation at the time of normal control.

DESCRIPTION OF EMBODIMENTS

Figure 1:
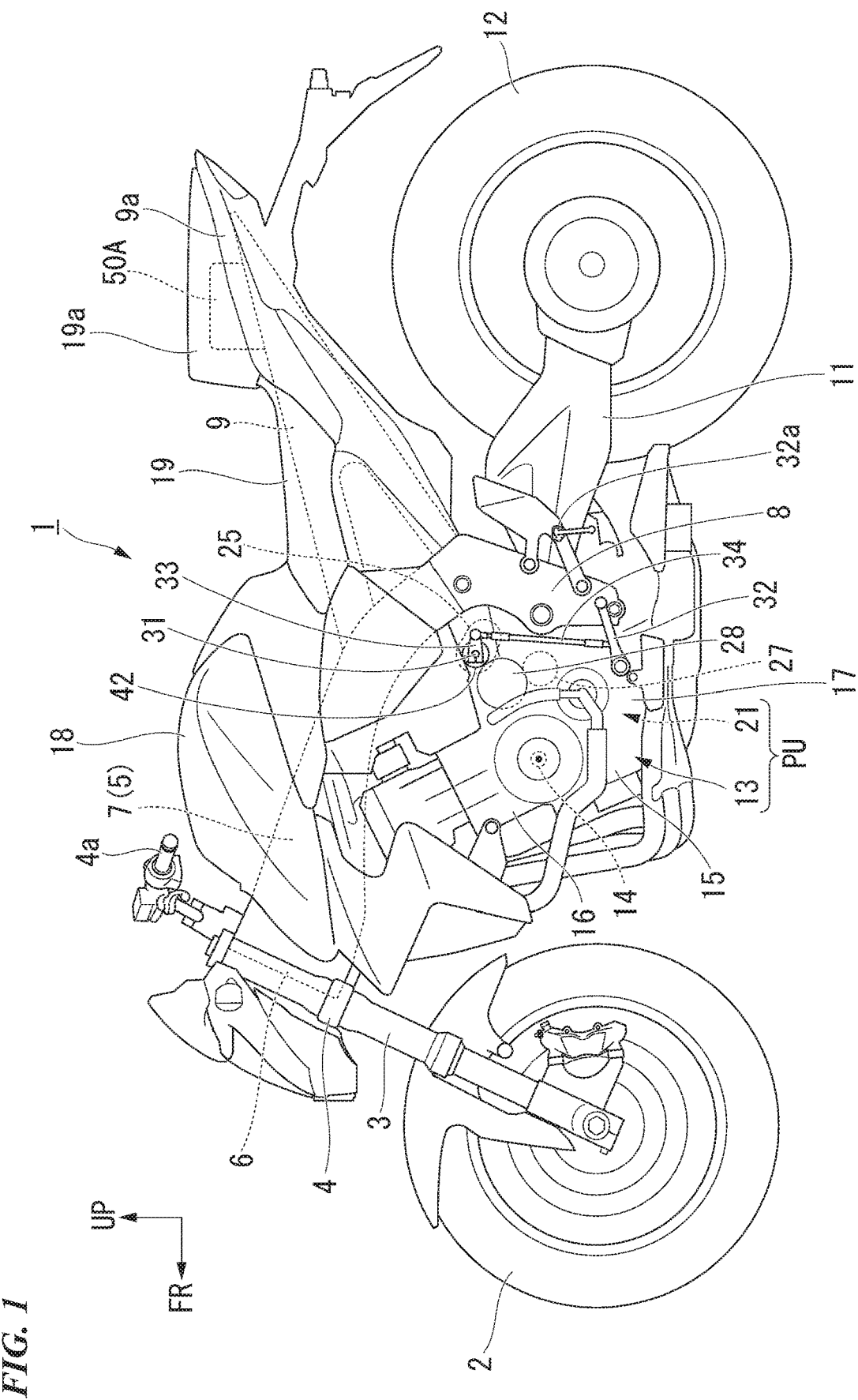
FIG. 1 is a left side view of a motorcycle according to the present embodiment.

Hereinafter, embodiments of the present invention will be described with reference to the drawings. Directions such as forward, rearward, left and right in the following description are the same as those in a vehicle described below unless otherwise specified. An arrow FR indicating the front of the vehicle, an arrow LH indicating the left side of the vehicle, and an arrow UP indicating the upper side of the vehicle are also shown at appropriate locations in the drawings used for the following description.

<Whole Vehicle>

As shown in FIG. 1, the present embodiment is applied to a motorcycle 1 that is a saddle-ride type vehicle. A front wheel 2 of the motorcycle 1 is supported by lower ends of a pair of left and right front forks 3.

Upper portions of the left and right front forks 3 are supported by a head pipe 6 at a front end of a vehicle body frame 5 via a steering stem 4. A bar-type steering handle 4a is attached to a top bridge of the steering stem 4.

The vehicle body frame 5 includes the head pipe 6, main tubes 7 that extend downward and rearward from the head pipe 6 over the center in the width direction (left-right direction) of the vehicle, left and right pivot frames 8 connected to the bottoms of rear ends of the main tubes 7, and a seat frame 9 connected to the rear sides of the main tubes 7 and the left and right pivot frames 8. Front ends of swing arms 11 are pivotally supported on the left and right pivot frames 8 such that the swing arms 11 are swingable. A rear wheel 12 of the motorcycle 1 is supported by rear ends of the swing arms 11.

A fuel tank 18 is supported above the left and right main tubes 7. A front seat 19 and a rear seat cover 19*a* are supported side by side behind the fuel tank 18 and above the seat frame 9. The periphery of the seat frame 9 is covered with a rear cowl 9*a*.

A power unit PU which is a prime mover of the motorcycle 1 is suspended below the left and right main tubes 7. The power unit PU is linked to the rear wheel 12, for example, via a chain transmission mechanism.

The power unit PU integrally includes an engine 13 located on the front side and a transmission 21 located on the rear side. The engine 13 is, for example, a multi-cylinder engine in which rotary shafts of a crankshaft 14 are aligned in the left-right direction (the width direction of the vehicle). The engine 13 raises cylinders 16 above a front portion of a crankcase 15. A rear portion of the crankcase 15 is a transmission case 17 that houses the transmission 21.

<Transmission>

Figure 2:
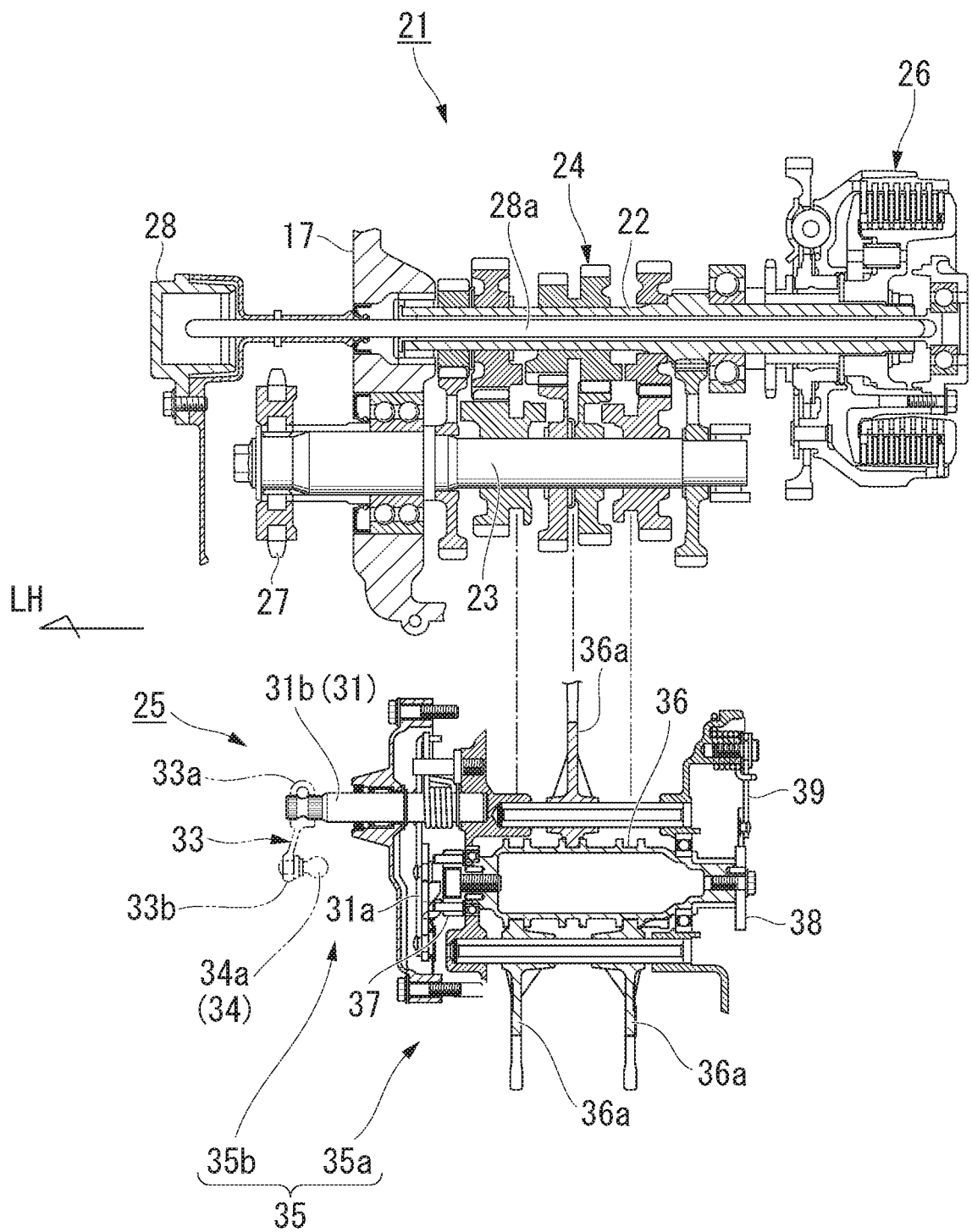
FIG. 2 is a cross-sectional view of a transmission and a change mechanism of the motorcycle.

As shown in FIG. 2, the transmission 21 is a stepped transmission having a main shaft 22, a counter shaft 23, and a transmission gear group 24 straddling both the shafts 22 and 23. The counter shaft 23 constitutes an output shaft of the transmission 21 and thus that of the power unit PU. An end of the counter shaft 23 protrudes to the left side of the rear portion of the crankcase 15 and is connected to the rear wheel 12 via the chain transmission mechanism.

The transmission gear group 24 includes a number of gears corresponding to the number of shift stages, which are supported by each of the shafts 22 and 23. The transmission 21 is of a constant meshing type in which corresponding gears of each gear pair of the transmission gear group 24 are always meshed with each other between the shafts 22 and 23. The plurality of gears supported by the shafts 22 and 23 are classified into free gears that can rotate with respect to the corresponding shaft and slide gears (shifters) that are spline-fitted to the corresponding shaft. Either a free gear or a slide gear is provided with axially convex dogs and the other is provided with axially concave slots to engage with the dogs. That is, the transmission 21 is a so-called dog mission.

Figure 3:
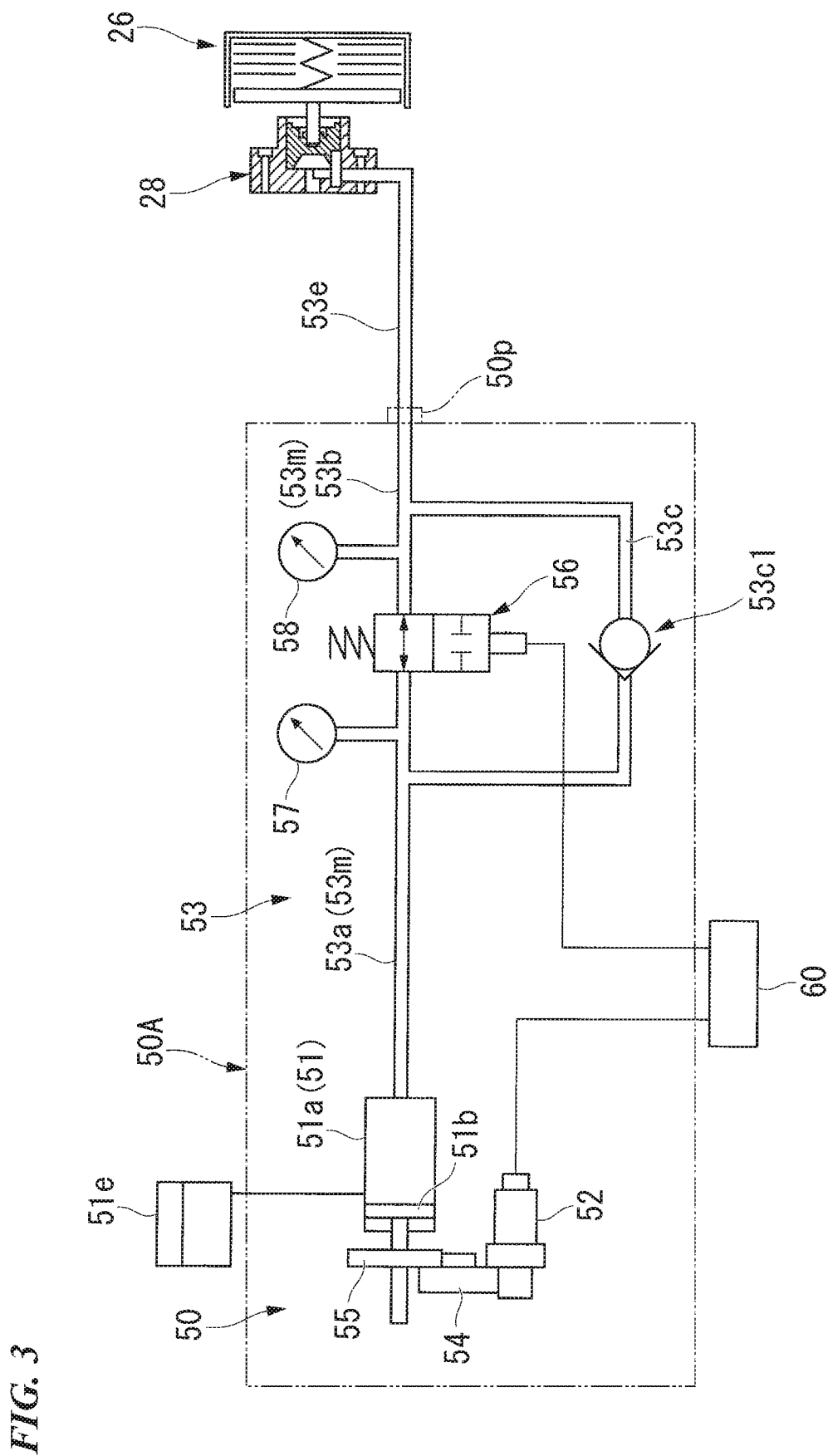
FIG. 3 is a schematic explanatory view of a clutch operation system including a clutch actuator.

Referring also to FIG. 3, the counter shaft 23 and the main shaft 22 of the transmission 21 are arranged in front of and behind each other behind the crankshaft 14. A clutch device 26 that is actuated by a clutch actuator 50 is coaxially arranged at a right end of the main shaft 22. The clutch device 26 is, for example, a wet multi-plate clutch, and is a so-called normally open clutch. That is, the clutch device 26 is brought into a connected state where power is transmittable due to hydraulic pressure supplied from the clutch actuator 50 and returns to a disconnected state where power is not transmittable if the supply of hydraulic pressure from the clutch actuator 50 is lost.

Referring to FIG. 2, rotational power of the crankshaft 14 is transmitted to the main shaft 22 via the clutch device 26 and is transmitted from the main shaft 22 to the counter shaft 23 via an arbitrary gear pair of the transmission gear group 24. A drive sprocket 27 of the chain transmission mechanism is attached to a left end of the counter shaft 23 that protrudes to the left side of the rear portion of the crankcase 15.

A change mechanism 25 for switching gear pairs of the transmission gear group 24 is housed in a rear upper portion of the transmission 21. The change mechanism 25 actuates, by the rotation of a hollow cylindrical shift drum 36 that is parallel to both the shafts 22 and 23, a plurality of shift forks 36*a* according to lead groove patterns formed on the outer periphery thereof and performs switching to a gear pair of the transmission gear group 24 used for power transmission between the shafts 22 and 23.

The change mechanism 25 includes a shift spindle 31 parallel to the shift drum 36.

When the shift spindle 31 rotates, a shift arm 31*a* fixed to the shift spindle 31 rotates the shift drum 36 to move the shift forks 36*a* in the axial direction according to the lead groove patterns, thus performing switching to a gear pair that can transmit power in the transmission gear group 24 (that is, switching the shift stage). Details of the change mechanism 25 will be described later.

The shift spindle 31 has an axially outer portion 31*b* protruding from the crankcase 15 outward (leftward) in the width direction of the vehicle such that the change mechanism 25 can be operated. A shift load sensor 42 (shift operation detecting means) is coaxially attached to the axially outer portion 31*b* of the shift spindle 31 (see FIG. 1). A swing lever 33 is attached to the axially outer portion 31*b* of the shift spindle 31 (or to a rotary shaft of the shift load sensor 42). The swing lever 33 extends rearward from a proximal end 33*a* thereof clamped and fixed to the shift spindle 31 (or to the rotary shaft) and an upper end of a link rod 34 is swingably connected to a distal end 33*b* of the swing lever 33 via an upper ball joint 34*a*. A lower end of the link rod 34 is swingably connected to a shift pedal 32 that is operated by the driver's foot via a lower ball joint (not shown).

As shown in FIG. 1, a front end of the shift pedal 32 is supported by a lower part of the crankcase 15 such that the shift pedal 32 is swingable up and down via a shaft extending in the left-right direction. The shift pedal 32 is provided at a rear end thereof with a pedal portion on which the tip of the driver's foot placed on a step 32*a* is put and the lower end of the link rod 34 is connected to an intermediate portion in the front-back direction of the shift pedal 32.

As shown in FIG. 2, a shift change device 35 includes the shift pedal 32, the link rod 34, and the change mechanism 25 and is configured to switch the gear of the transmission 21. In the shift change device 35, an assembly (of the shift drum 36, the shift forks 36*a*, and the like) that switches the shift stage of the transmission 21 in the transmission case 17 is referred to as a shift operating portion 35*a* and an assembly (of the shift spindle 31, the shift arm 31*a*, and the like) that rotates about the axis of the shift spindle 31 as a shift operation is input to the shift pedal 32 and transmits this rotation to the shift operating portion 35*a* is referred to as a shift operation receiving portion 35*b*.

Here, the motorcycle 1 employs a so-called semi-automatic transmission system (automatic clutch transmission system) in which the driver performs only the shift operation of the transmission 21 (the foot operation of the shift pedal 32) and the connection and disconnection operation of the clutch device 26 is automatically performed by electric control according to the operation of the shift pedal 32.

<Transmission System>

Figure 4:
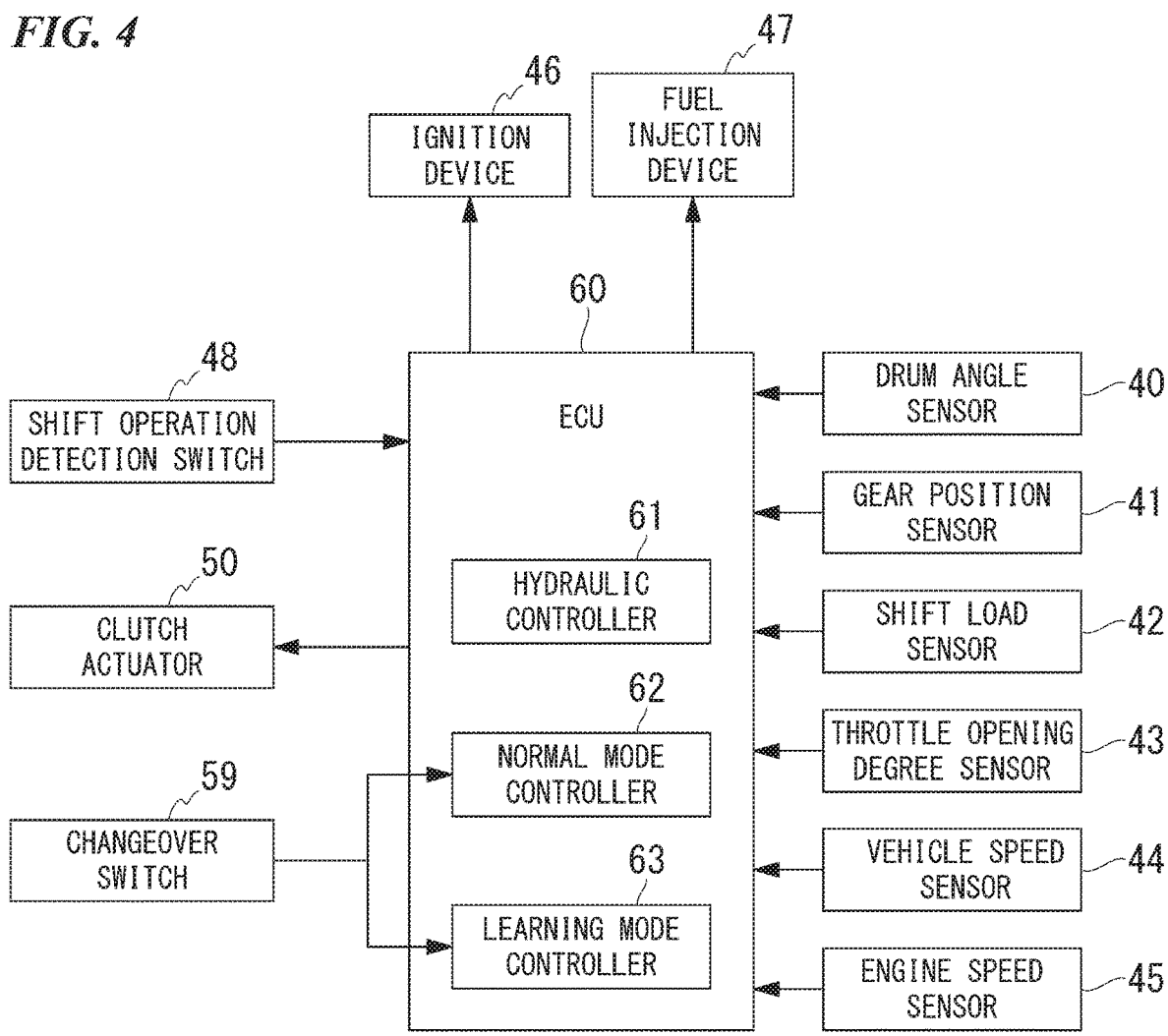
FIG. 4 is a block diagram of a transmission system.

As shown in FIG. 4, the transmission system described above includes the clutch actuator 50, an electronic control unit (ECU) 60 (control device) and various sensors 40 to 45.

The ECU 60 performs actuation control of the clutch actuator 50 and actuation control of an ignition device 46 and a fuel injection device 47 on the basis of detection information from a gear position sensor 41 that detects a shift stage from the rotation angle of the shift drum 36 and a shift load sensor (for example, a torque sensor) 42 that detects an operation torque input to the shift spindle 31 and various vehicle state detection information or the like from a throttle opening degree sensor 43, a vehicle speed sensor 44, an engine speed sensor 45 and the like. Detection information from hydraulic pressure sensors 57 and 58 which will be described later and a shift operation detection switch (shift-to-neutral switch) 48 is also input to the ECU 60.

Further, the ECU 60 includes a hydraulic pressure controller 61, a normal mode controller 62, and a learning mode controller 63, the functions of which will be described later.

Referring also to FIG. 3, through actuation control of the ECU 60, the clutch actuator 50 can control the hydraulic pressure for connecting and disconnecting the clutch device 26. The clutch actuator 50 includes an electric motor 52 (hereinafter simply referred to as a motor 52) as a drive source and a master cylinder 51 that is driven by the motor 52. The clutch actuator 50 and a hydraulic circuit device 53 that is provided between the master cylinder 51 and a hydraulic supply/discharge port 50p constitute an integral clutch control unit 50A.

Based on a preset calculation program, the ECU 60 calculates a target value of the hydraulic pressure (target hydraulic pressure) supplied to a slave cylinder 28 for connecting and disconnecting the clutch device 26 and controls the clutch control unit 50A such that the hydraulic pressure (the current hydraulic pressure) on the slave cylinder 28 side detected by the downstream hydraulic pressure sensor 58 approaches the target hydraulic pressure.

The master cylinder 51 strokes a piston 51b in a cylinder body 51a through driving of the motor 52, such that actuation oil in the cylinder body 51a can be supplied to and discharged to the slave cylinder 28. In the figure, reference sign 55 denotes a conversion mechanism as a ball screw mechanism, reference sign 54 denotes a transmission mechanism straddling the motor 52 and the conversion mechanism 55, and reference sign 51e denotes a reservoir connected to the master cylinder 51.

The hydraulic circuit device 53 has a valve mechanism (a solenoid valve 56) that opens or closes an intermediate portion of a main oil passage (hydraulic supply/discharge passage) 53m extending from the master cylinder 51 to the clutch device 26 side (the slave cylinder 28 side). The main oil passage 53m of the hydraulic circuit device 53 is divided into an upstream oil passage 53a that is closer to the master cylinder 51 than to the solenoid valve 56 and a downstream oil passage 53b that is closer to the slave cylinder 28 than to the solenoid valve 56. The hydraulic circuit device 53 further includes a bypass oil passage 53c that bypasses the solenoid valve 56 and allows the upstream oil passage 53a and the downstream oil passage 53b to communicate with each other.

The solenoid valve 56 is a so-called normally open valve. The bypass oil passage 53c is provided with a one-way valve 53c1 that circulates actuation oil only in a direction from the upstream side to the downstream side. An upstream hydraulic pressure sensor 57 that detects the hydraulic pressure of the upstream oil passage 53a is provided upstream of the solenoid valve 56. A downstream hydraulic pressure sensor 58 that detects the hydraulic pressure of the downstream oil passage 53b is provided downstream of the solenoid valve 56.

As shown in FIG. 1, the clutch control unit 50A is housed, for example, in the rear cowl 9a. The slave cylinder 28 is attached to the rear left side of the crankcase 15. The clutch control unit 50A and the slave cylinder 28 are connected via a hydraulic pipe 53e (see FIG. 3).

As shown in FIG. 2, the slave cylinder 28 is coaxially arranged on the left side of the main shaft 22. The slave cylinder 28 presses a push rod 28a penetrating through the main shaft 22 to the right when hydraulic pressure is supplied from the clutch actuator 50. By pressing the push rod 28a to the right, the slave cylinder 28 actuates the clutch device 26 into the connected state via the push rod 28a. When the supply of hydraulic pressure is lost, the slave cylinder 28 releases the push rod 28a to return the clutch device 26 to the disconnected state.

To maintain the clutch device 26 in the connected state, it is necessary to continue the supply of hydraulic pressure, but electric power is consumed accordingly. Therefore, as shown in FIG. 3, the solenoid valve 56 is provided in the hydraulic circuit device 53 of the clutch control unit 50A and is closed after hydraulic pressure is supplied to the clutch device 26 side. This provides a structure for maintaining the hydraulic pressure supplied to the clutch device 26 side and compensating the hydraulic pressure for the pressure drop (recharging it with the same amount of hydraulic pressure as leaked) to curb energy consumption.

<Clutch Control>

Figure 5:
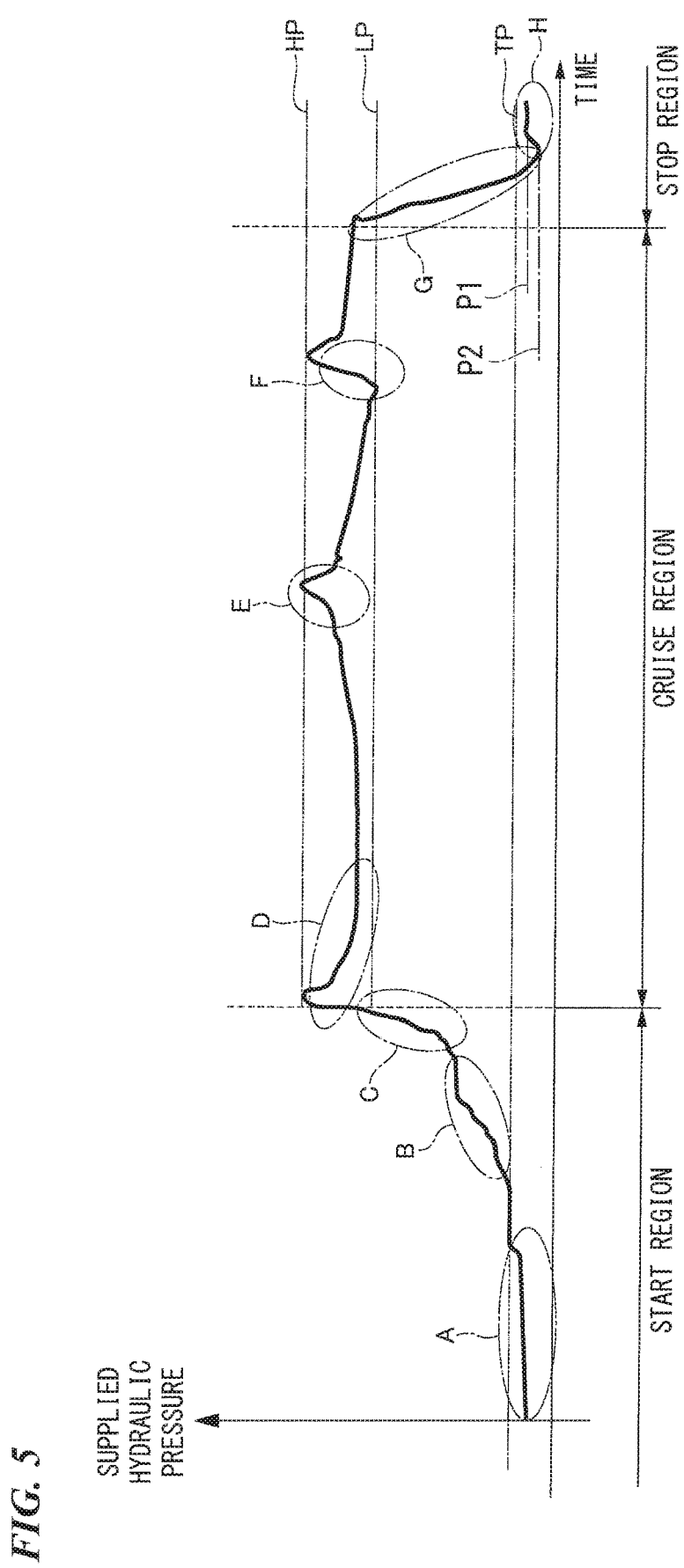
FIG. 5 is a graph showing changes in hydraulic pressure supplied to the clutch actuator.

Next, the operation of a clutch control system will be described with reference to a graph of FIG. 5. In the graph of FIG. 5, the vertical axis indicates the supplied hydraulic pressure detected by the downstream hydraulic pressure sensor 58 and the horizontal axis indicates the elapsed time.

When the motorcycle 1 is stationary (idle), the motor 52 and the solenoid valve 56 controlled by the ECU 60 are both in a state where electric power supply is cut off. That is, the motor 52 is in a stopped state and the solenoid valve 56 is in an open state. At this time, the slave cylinder 28 side (the downstream side) is in a low pressure state less than a touch point hydraulic pressure TP and the clutch device 26 is in a decoupled state (a disconnected state or a released state). This state corresponds to a region A in FIG. 5.

When the speed of the engine 13 is increased at the start of the motorcycle 1, electric power is supplied only to the motor 52 and hydraulic pressure is supplied from the master cylinder 51 to the slave cylinder 28 via the solenoid valve 56 in the open state. When the hydraulic pressure on the slave cylinder 28 side (the downstream side) increases above the touch point hydraulic pressure TP, coupling of the clutch device 26 is started and the clutch device 26 enters a half-clutch state where a part of power can be transmitted. This allows the motorcycle 1 to start smoothly. This state corresponds to a region B in FIG. 5.

Eventually, when the difference between the input rotation and the output rotation of the clutch device 26 is reduced and the hydraulic pressure on the slave cylinder 28 side (the downstream side) reaches a lower limit holding hydraulic pressure LP, the coupling of the clutch device 26 shifts to a locked state and the drive power of the engine 13 is all transmitted to the transmission 21. This state corresponds to a region C in FIG. 5.

When supplying hydraulic pressure from the master cylinder 51 side to the slave cylinder 28 side, the solenoid valve 56 is opened and the motor 52 is energized and driven forward to pressurize the master cylinder 51. Thereby, the hydraulic pressure on the slave cylinder 28 side is adjusted to a clutch coupling hydraulic pressure. At this time, driving of the clutch actuator 50 is feedback-controlled on the basis of the hydraulic pressure detected by the downstream hydraulic pressure sensor 58.

Then, when the hydraulic pressure on the slave cylinder 28 side (the downstream side) reaches an upper limit holding hydraulic pressure HP, electric power is supplied to the solenoid valve 56, the solenoid valve 56 is actuated such that it is closed and electric power supply to the motor 52 is stopped such that generation of hydraulic pressure is stopped. That is, the hydraulic pressure on the upstream side is released into a low pressure state, while that of the downstream side is maintained in a high pressure state (the upper limit holding hydraulic pressure HP). As a result, the clutch device 26 is maintained in the coupled state without the master cylinder 51 generating hydraulic pressure and thus electric power consumption can be curbed while the motorcycle 1 is allowed to run.

Here, depending on the shift operation, there may be cases such as where shifting is performed immediately after the clutch device 26 is filled with hydraulic pressure. In this case, before the solenoid valve 56 is closed to bring the upstream side into a low pressure state, the motor 52 is driven in reverse with the solenoid valve 56 remaining in the open state and the reservoir 51*e* is communicated while decompressing the master cylinder 51, such that the hydraulic pressure of the clutch device 26 side is relieved to the master cylinder 51 side. At this time, driving of the clutch actuator 50 is feedback-controlled on the basis of the hydraulic pressure detected by the upstream hydraulic pressure sensor 57.

Even when the solenoid valve 56 is closed and the clutch device 26 is maintained in the coupled state, the hydraulic pressure on the downstream side gradually decreases (leaks) as in a region D of FIG. 5. That is, the hydraulic pressure on the downstream side gradually decreases due to factors such as hydraulic leakage and temperature decrease caused by deformation or the like of seals of the solenoid valve 56 and the one-way valve 53*c*1.

On the other hand, the hydraulic pressure on the downstream side may increase due to temperature increase or the like as shown in a region E in FIG. 5.

When there is a small hydraulic pressure fluctuation on the downstream side, it can be absorbed by an accumulator (not shown), which prevents an increase in electric power consumption due to actuation of the motor 52 and the solenoid valve 56 every time a hydraulic pressure fluctuation occurs.

When the hydraulic pressure on the downstream side has increased to the upper limit holding hydraulic pressure HP as shown in the region E of FIG. 5, the solenoid valve 56 is gradually opened to relieve the hydraulic pressure of the downstream side to the upstream side, for example, by reducing electric power supply to the solenoid valve 56.

When the hydraulic pressure on the downstream side has decreased to the lower limit holding hydraulic pressure LP as in a region F of FIG. 5, the solenoid valve 56 remains closed and electric power supply to the motor 52 is started to increase the hydraulic pressure on the upstream side. When the hydraulic pressure on the upstream side has exceeded the hydraulic pressure on the downstream side, this excessive hydraulic pressure is returned (recharged) to the downstream side via the bypass oil passage 53*c* and the one-way valve 53*c*1. When the hydraulic pressure on the downstream side has reached the upper limit holding hydraulic pressure HP, electric power supply to the motor 52 is stopped and generation of the hydraulic pressure is stopped. Thus, the hydraulic pressure on the downstream side is maintained between the upper limit holding hydraulic pressure HP and the lower limit holding hydraulic pressure LP and the clutch device 26 is maintained in the coupled state.

If the transmission 21 is in neutral when the motorcycle 1 is stopped, electric power supply to both the motor 52 and the solenoid valve 56 is stopped. Thus, the master cylinder 51 stops generating hydraulic pressure and stops supplying hydraulic pressure to the slave cylinder 28. The solenoid valve 56 is opened and the hydraulic pressure in the downstream oil passage 53*b* is returned to the reservoir 51*e*. As a result, the slave cylinder 28 side (the downstream side) is brought into a low pressure state less than the touch point hydraulic pressure TP and the clutch device 26 is decoupled. This state corresponds to regions G and H in FIG. 5.

On the other hand, if the transmission 21 remains in gear when the motorcycle 1 is stopped, it enters a standby state where a standby hydraulic pressure WP is applied to the slave cylinder 28 side.

The standby hydraulic pressure WP is a hydraulic pressure slightly lower than the touch point hydraulic pressure TP at which the clutch device 26 starts to be connected and is a hydraulic pressure at which the clutch device 26 is not connected (a hydraulic pressure applied in the regions A and H in FIG. 5). Applying the standby hydraulic pressure WP allows invalid filling of the clutch device 26 (removal of looseness or reaction to actuation of each part, application of preliminary pressure to the hydraulic path, or the like), thus enhancing operation responsiveness when connecting the clutch device 26.

<Change Mechanism>

Figure 6:
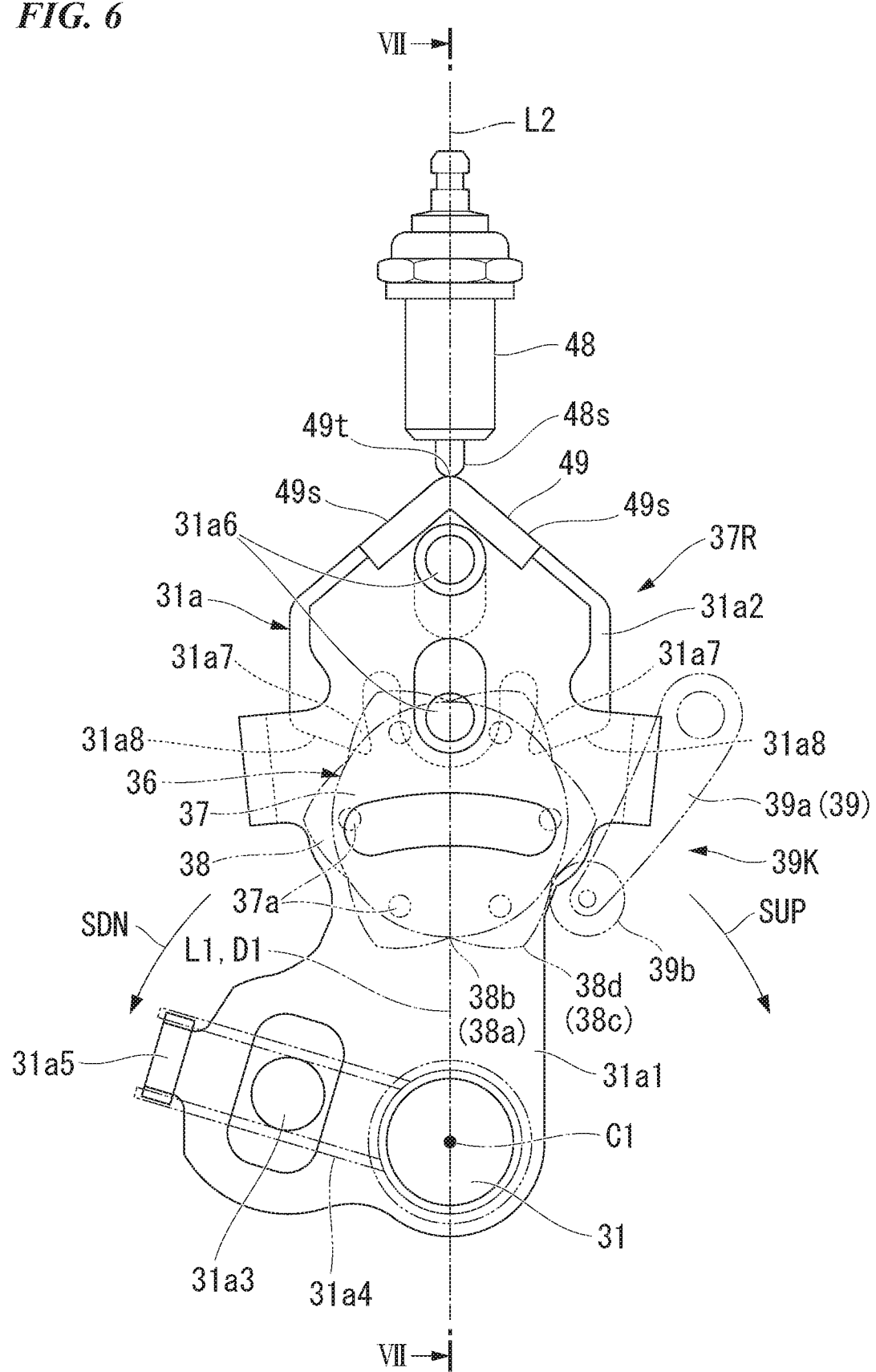
FIG. 6 is a front view of a shift arm and a shift operation detection switch when viewed in the axial direction of a shift spindle.

Referring to FIGS. 2 and 6, the change mechanism 25 includes a shift drum center 37 that is disposed at one end of the shift drum 36 and rotates integrally with the shift drum 36 and a shift drum plate 38 that is disposed at the other end of the shift drum 36 and similarly rotates integrally with the shift drum 36. A shift arm 31*a* is disposed outside the shift drum center 37 in the axial direction thereof such that the shift arm 31*a* faces the shift drum center 37. A plurality of feed pins 37*a* that protrude toward the shift arm 31*a* are arranged and fixed to the shift drum center 37 in the circumferential direction. A plurality of valleys 38*a* and peaks 38*c* are alternately arranged on the outer periphery of the shift drum plate 38 in the circumferential direction.

A stopper arm 39 extending toward the outer periphery of the shift drum plate 38 is swingably supported by the transmission case 17. The stopper arm 39 supports a stopper roller 39*b*, which can engage with any valley 38*a* of the shift drum plate 38, at the distal end of an arm body 39*a*. The stopper arm 39 is biased to press the stopper roller 39*b* against the valley 38*a* of the shift drum plate 38. Each valley 38*a* has a valley bottom 38*b* that is arcuate when viewed in the axial direction and matches an outer peripheral surface of the stopper roller 39*b*. The stopper arm 39 restricts the rotation of the shift drum plate 38 and thus that of the shift drum 36 by pressing the stopper roller 39*b* against the valley bottom 38*b* of the shift drum plate 38.

The stopper arm 39 swings against its bias force and permits the shift drum 36 to rotate when a shift operating force greater than a predetermined value is applied to the shift drum 36. At this time, the stopper roller 39*b* rolls on a slope, on one side in the circumferential direction, of the valley 38*a* currently engaged and rides on an adjacent peak 38*c*. When the stopper roller 39*b* passes over a top portion 38*d* of the peak 38*c* that has been ridden, the stopper roller 39*b* rolls on a slope at the tip of the top portion 38*d* and biases and rotates the shift drum plate 38 and thus the shift drum 36 to the other side in the circumferential direction. Thereafter, the stopper roller 39*b* engages with a valley 38*a* next to the valley 38*a* that has been engaged, and restricts the rotation of the shift drum plate 38 and thus that of the shift drum 36 at the shift position of a next stage. The shift drum plate 38 and the stopper roller 39*b* constitute a rotational position defining mechanism 39K that defines the rotational position of the shift drum 36.

The shift arm 31a includes an arm body 31a1 and a shifter plate 31a2. The arm body 31a1 has a plate shape perpendicular to the shift spindle 31 and the proximal end side thereof is fixed to the shift spindle 31. The arm body 31a1 extends along an extension reference line L1 such that it overlaps the shift drum 36 when viewed in the axial direction. The arm body 31a1 extends until the distal end side thereof passes through the shift drum 36 when viewed in the axial direction. The shifter plate 31a2 is attached to the distal end side of the arm body 31a1 on the shift drum 36 side.

A restricting bolt 31a3 fixed to the transmission case 17 engages with the proximal end side of the arm body 31a1 at a position with a predetermined angle with respect to the extension reference line L1 when viewed in the axial direction. A return spring 31a4 that is a torsion coil spring is externally fitted in the vicinity of the arm body 31a1 of the shift spindle 31. The restricting bolt 31a3 is sandwiched between a pair of ends of the return spring 31a4 that extend in the radial direction, and a spring receiving portion 31a5 formed on the proximal end side of the arm body 31a1 is also sandwiched therebetween.

When the shift arm 31a rotates with the rotation of the shift spindle 31, the pair of coil ends of the return spring 31a4 are spread apart from each other due to the relative movement of the spring receiving portion 31a5 and the restricting bolt 31a3. Thereafter, when the force for rotating the shift arm 31a disappears, the shift arm 31a is returned to a neutral position D1 due to the elastic force of the return spring 31a4.

The shifter plate 31a2 has a plate shape parallel to the arm body 31a1. The shifter plate 31a2 is attached to the arm body 31a1 via a slide mechanism 31a6 that is a pair of sets of a guide pin and a long hole. The shifter plate 31a2 can slide with respect to the arm body 31a1 by a predetermined amount along the extension reference line L1. The shifter plate 31a2 is biased with respect to the arm body 31a1, to the shift spindle 31 side, by a biasing means (not shown).

The shift drum plate 38 has valleys 38a corresponding to a plurality of shift stages (for example, six stages) of the transmission 21. Each valley 38a allows the stopper roller 39b to engage with a valley bottom 38b when the shift drum 36 is in a rotational position corresponding to any shift stage of the transmission 21.

The stopper roller 39b engages with the valley bottom 38b of the shift drum plate 38 in a biased state, thereby restricting the rotation of the shift drum 36 and defining a rotational position corresponding to each shift stage of the shift drum 36. A recess (not shown) corresponding to neutral is formed at a top portion 38d of a peak 38c between valleys 38a corresponding to the first and second speeds.

A ratchet mechanism 37R that intermittently feeds the shift drum center 37 through a predetermined rotation angle according to the swing of the shift arm 31a is configured between the shift arm 31a and the shift drum center 37.

The ratchet mechanism 37R rotates the shift drum center 37 from a rotational position defined by the shift drum plate 38 and the stopper roller 39b to the shift-up side or the shift-down side as the shift arm 31a swings from the neutral position D1. After the shift drum center 37 rotates, the ratchet mechanism 37R allows only the shift arm 31a to return to the neutral position D1 before swinging. Thus, repeating forward and reverse rotations of the shift spindle 31 allows the shift drum 36 to be intermittently fed through a predetermined angle such that shift stages can be switched between.

A pair of feed claws 31a7 that engage with feed pins 37a of the shift drum center 37 are formed on the shifter plate 31a2. When the shift arm 31a is in the neutral position D1, the pair of feed claws 31a7 of the shifter plate 31a2 engage with some of the plurality of feed pins 37a of the shift drum center 37. In this state, when the change spindle is rotated in either the forward or reverse direction by the rider's shift operation, the shift arm 31a rotates integrally with this change spindle and the shift drum plate 38 and thus the shift drum 36 rotate via one of the pair of feed claws 31a7 of the shifter plate 31a2 and a feed pin 37a engaged with the feed claw.

The shift arm 31a rotates through an angle defined, for example, by engagement with the restricting bolt 31a3. During this rotation, the stopper roller 39b rides on a peak 38c adjacent to one side in the circumferential direction of the valley 38a currently engaged and reaches a next valley 38a after passing over the top portion 38d of the peak 38c. The rotation of the shift arm 31a is restricted before the stopper roller 39b reaches the valley bottom 38b of the next valley 38a. However, if the stopper roller 39b passes over the top portion 38d of the peak 38c, the shift drum plate 38 and thus the shift drum 36 are biased and rotated to the other side in the circumferential direction due to the bias force of the stopper roller 39b. As a result, the shift drum 36 stops at a rotational position corresponding to the next shift stage defined by the shift drum plate 38 and the stopper roller 39b.

After the shift operation, the shift arm 31a is returned to the neutral position D1 by the elastic force of the return spring 31a4. A cam surface 31a8 which is in sliding contact with the feed pin 37a when the shift arm 31a returns to the neutral position D1 is formed at the distal ends of the pair of feed claws 31a7 of the shifter plate 31a2. The cam surface 31a8 is in sliding contact with the feed pin 37a when the shift arm 31a returns to the neutral position D1 and strokes the shifter plate 31a2 toward the distal end side of the arm body 31a1. Thereby, when the shift arm 31a returns to the neutral position D1, the feed claw 31a7 passes over the feed pin 37a. At this time, the rotational position of the shift drum 36 is stably held by the engagement of the stopper roller 39b and the shift drum plate 38. When the shift arm 31a returns to the neutral position D1, the shifter plate 31a2 strokes toward the proximal end side of the arm body 31a1 due to the bias force and returns to a state where the pair of feed claws 31a7 engage with the feed pins 37a of the shift drum center 37. The shifter plate 31a2 and the shift drum center 37 mainly constitute the ratchet mechanism 37R.

When the shift spindle 31 and the shift arm 31a reciprocate forward and backward through a predetermined angle, the shift drum center 37 and the shift drum 36 rotate through a predetermined angle (60 degrees in the case of six speeds) in one direction through the ratchet mechanism 37R. This rotation angle corresponds to an angle with which the shift stage of the transmission 21 is shifted up or down by one stage. Due to the rotation of the shift drum 36, the transmission 21 changes the current shift stage to the next shift stage on the shift-up side or the shift-down side. The shift spindle 31 and the shift arm 31a repeat forward and reverse reciprocation at a predetermined angle to shift the transmission 21 up or down stepwise.

The shift drum 36 has a cam surface for shift position detection. The cam surface has protrusions corresponding to all shift stages including neutral. A protrusion of the cam surface is detected by the gear position sensor 41 (see FIG. 4) and the detection is sent to the ECU 60, whereby the current shift stage of the transmission 21 is detected. The shift drum center 37 and the shift drum plate 38 may be disposed on the same side of the shift drum 36 or may be integrated with each other.

<Learning Mode>

The ECU 60 has a gear position learning mode for accurately detecting the gear position of the transmission 21 upon assembling, replacement, or the like of the transmission 21 in addition to the normal control mode.

The ECU 60 detects the gear position of the transmission 21 normally by detecting the rotational position of the shift drum 36 through the gear position sensor 41. However, the rotational position of the shift drum 36 cannot be detected accurately in a configuration in which the gear position sensor 41 detects the cam surface of the shift drum 36.

In addition, which gear position of the transmission 21 the output value of the gear position sensor 41 corresponds to is not accurately determined and the gear position of the transmission 21 cannot be accurately detected immediately after assembly, replacement, maintenance, or the like of the transmission 21 and also immediately after assembly, replacement, maintenance, or the like of the drum angle sensor 40.

In recent years, various electric controls according to the gear position of the transmission 21 have been proposed. Therefore, it is desired to accurately and precisely detect the gear position of the transmission 21 and thus the rotational position of the shift drum 36.

In the transmission system (automatic clutch system) of the present embodiment, engine output reduction control is performed at the time of shifting, and control for returning the engine output is performed after a regular in-gear in the next stage is confirmed. The regular in-gear in the next stage is determined based on the rotational position of the shift drum 36 being in a regular in-gear position corresponding to the gear of the next stage (a next-stage regular in-gear position). When the next-stage regular in-gear position of the shift drum 36 is unclear, the engine output reduction time is extended more than necessary and the variation in the drive omission time increases.

The next-stage regular in-gear position of the shift drum 36 corresponds to the rotational position of the shift drum 36 determined by the rotational position defining mechanism 39K. However, a deviation may occur between the rotational position of the shift drum 36 and the rotational position defined by the rotational position defining mechanism 39K due to the influence of component tolerance, assembly tolerance, or the like. In this case, the next-stage regular in-gear position becomes unclear, the engine output reduction time is extended more than necessary, and the variation in the drive omission time increases.

In the present embodiment, in the gear position learning mode, connection and disconnection of the clutch device 26 is controlled such that the shift drum 36 is at the rotational position determined by the rotational position defining mechanism 39K. That is, the rotation angle of the shift drum 36 and the hydraulic control of the clutch device 26 are linked to each other. As a result, the next-stage regular in-gear position is clarified, variation in the drive omission time is curbed at all shift stages, and a stable shift feeling is achieved. Details of the learning control will be described later.

The ECU 60 includes memories such as a read only memory (ROM) and a random access memory (RAM) in addition to a central processing unit (CPU). Examples of data stored in the ROM include a designed map indicating the correlation between the detected value of the gear position sensor 41 and the rotation angle of the shift drum 36, in addition to a control program for the fuel injection device 47 and the ignition device 46. Examples of data stored in the RAM include the rotation angle (regular in-gear position) of the shift drum 36 for each shift stage obtained during the learning mode.

In the present embodiment, the ECU 60 includes the learning mode controller 63 that performs control for learning the rotation angle of the shift drum 36 in addition to the normal mode controller 62 that performs normal clutch control. Upon entering the learning mode for learning the rotation angle of the shift drum 36, the learning mode controller 63 controls connection and disconnection of the clutch device 26 such that the shift drum 36 is at the rotational position determined by the rotational position defining mechanism 39K.

In clutch control during the learning mode, the ECU 60 brings the clutch device 26 into a disconnected state, for example, after avoiding a dog hit occurring in the transmission 21.

Referring to FIGS. 5 and 6, during the learning mode, the ECU 60 sets the clutch hydraulic pressure to the standby hydraulic pressure WP+α (which is more than or equal to (or more than) a shift hydraulic pressure value PS2 shown in FIG. 5) until the stopper roller 39b reaches one of the plurality of top portions 38d of the shift drum plate 38. Thereby, the torque of the engine 13 is slightly transmitted to the transmission 21, such that a dog hit occurring in the transmission 21 can be eliminated.

When the stopper roller 39b has passed over the top portion 38d of the shift drum plate 38, the ECU 60 reduces the hydraulic pressure of the clutch device 26 and substantially disconnects the clutch device 26. Specifically, during the learning mode, the ECU 60 sets the clutch hydraulic pressure to the standby hydraulic pressure WP−α (which is less than or equal to (or less than) a learning hydraulic pressure value PS1 shown in FIG. 5) after the stopper roller 39b passes over one of the plurality of top portions 38d of the shift drum plate 38. Thereby, the clutch device 26 is brought into a disconnected state, such that the shift drum plate 38 and thus the shift drum 36 can be rotated only by the bias force of the stopper roller 39b and the stopper roller 39b can be guided to the next valley bottom 38b of the shift drum plate 38.

Thus, the rotation angle of the shift drum 36 during being in-gear can be learned with high accuracy with the rotational position of the shift drum 36 being defined only by the bias force of the rotational position defining mechanism 39K.

After storing the angle of the shift drum 36 with the stopper roller 39b reaching the valley bottom 38b, the ECU 60 waits for the clutch hydraulic pressure to be about the standby hydraulic pressure WP−α to prepare for learning of the next-stage in-gear position.

In the learning mode, the regular in-gear position of the shift drum 36 cannot be determined unless the shift load is completely removed. On the other hand, the output of the shift load sensor 42 does not change unless a certain load or more is applied. For this reason, the regular in-gear position of the shift drum 36 cannot be determined only by the output of the shift load sensor 42.

In the present embodiment, the shift operation detection switch (shift-to-neutral switch) 48 that detects the neutral position D1 of the shift arm 31a linked to the shift pedal 32 is used to accurately determine the regular in-gear position. Thereby, it is possible to detect a state where the pedal load is completely removed and thus to accurately learn the regular in-gear position.

Figure 11:
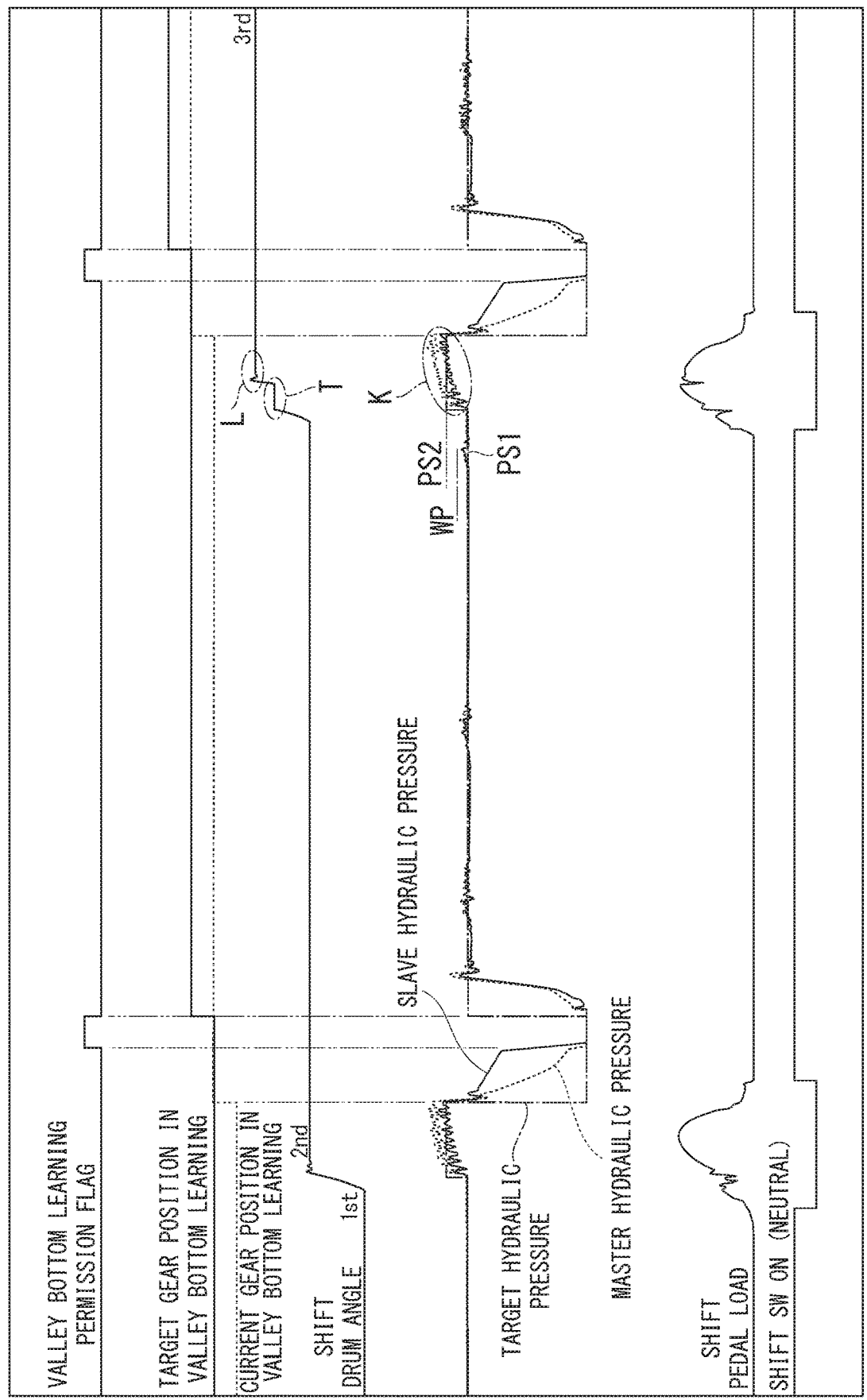
FIG. 11 is a timing chart showing temporal changes of elements relating to the control flow of FIG. 10.

Referring to FIGS. 6 and 11, during the learning mode, the ECU 60 sets the hydraulic pressure supplied to the clutch device 26 to be less than or less than or equal to a predetermined learning hydraulic pressure value PS1 when the stopper roller 39b moves from a top portion 38d of one peak 38c of the shift drum plate 38 toward a valley bottom 38b of an adjacent valley 38a. Thereby, the clutch hydraulic pressure can be made to correspond to the disconnected state, such that the shift drum plate 38 can be rotated only by the bias force of the stopper roller 39b and the rotational position of the shift drum 36 can be mechanically determined by the rotational position defining mechanism 39K.

During the learning mode, the ECU 60 permits learning of the rotation angle of the shift drum 36 upon setting the hydraulic pressure supplied to the clutch device 26 to be less than or less than or equal to the learning hydraulic pressure value PS1. Thereby, the in-gear position can be accurately learned with the rotational position of the shift drum 36 being mechanically determined by the rotational position defining mechanism 39K. The ECU 60 detects when the stopper roller 39b passes over a top portion 38d of the shift drum plate 38, when the stopper roller 39b moves from a valley bottom 38b of the shift drum plate 38 toward a top portion 38d, and the like from the rotation angle of the shift drum 36.

During the learning mode, the ECU 60 sets the hydraulic pressure supplied to the clutch device 26 to a value that is more than or equal to or more than a predetermined shift hydraulic pressure value PS2 when the stopper roller 39b moves from a valley bottom 38b of one valley 38a of the shift drum plate 38 toward a top portion 38d of an adjacent peak 38c. Then, the ECU 60 maintains the state where the clutch hydraulic pressure is set to a value that is more than or equal to or more than the shift hydraulic pressure value PS2 until the stopper roller 39b passes over the top portion 38d of the shift drum plate 38. Thereby, the torque of the engine 13 is slightly transmitted to the transmission 21 with the clutch hydraulic pressure corresponding to a weakly connected state, such that control for avoiding a dog hit occurring in the transmission 21 can be performed.

During the learning mode, the ECU 60 permits learning of the rotation angle of the shift drum 36 upon detecting that the shift arm 31a is at the neutral position D1. That is, when the shift arm 31a is moved from the neutral position D1 by an external force applied to the shift pedal 32, the shift arm 31a may cause a deviation in the position of the shift drum 36. However, it is possible to ensure that the shift arm 31a does not cause a deviation in the position of the shift drum 36 by permitting learning of the rotation angle of the shift drum 36 when the shift arm 31a is at the neutral position D1.

During the learning mode, the ECU 60 permits learning of the rotation angle of the shift drum 36 when the rotation angle of the shift drum 36 is within a predetermined range. The rotation angle of the shift drum 36 being within a predetermined range means that the rotation angle of the shift drum 36 with respect to a reference position such as the neutral position of the shift drum 36 is within the predetermined range from its designed rotation angle. A dog hit of the transmission 21 or the like may occur if the rotation angle of the shift drum 36 deviates beyond the predetermined range. Therefore, learning of the rotation angle of the shift drum 36 in this case can be canceled. The above may also mean that the rotation angle of the shift drum 36 is within the predetermined range from the designed rotation angle in the gear position detected by the gear position sensor 41.

During the learning mode, the ECU 60 permits learning of the rotation angle of the shift drum 36 when the gear position detected by the gear position sensor 41 matches a predetermined target gear position. Thus, when the current gear position detected by the gear position sensor 41 does not match the target gear position predetermined in the ECU 60, learning of the rotation angle of the shift drum 36 is not permitted, such that erroneous learning can be prevented.

Referring to FIG. 4, the present embodiment is provided with a changeover switch 59 that switches the mode of the ECU 60. The changeover switch 59 is disposed, for example, inside the vehicle body cover or under the seat such that the rider does not erroneously operate it during normal driving since the learning of the rotation angle of the shift drum 36 is based on the premise that corresponding work is performed in a factory, a store, and the like. Thus, erroneous operation at the time of normal control can be prevented.

<Shift Control>

Next, shift control of the motorcycle 1 will be described.

The motorcycle 1 of the present embodiment performs control for reducing the standby hydraulic pressure WP supplied to the slave cylinder 28 when a shift operation from the first speed to neutral is performed on the shift pedal 32 in an in-gear stationary state where the gear position of the transmission 21 is in the in-gear state of the first speed and the vehicle speed is less than a set value corresponding to the vehicle being stationary.

Here, when the motorcycle 1 is in a stationary state and the gear position of the transmission 21 is in any gear position other than neutral, that is, when the transmission 21 is in the in-gear stationary state, the preset standby hydraulic pressure WP is supplied to the slave cylinder 28.

The standby hydraulic pressure WP is set to a first set value P1 (see FIG. 5) that is a standard standby hydraulic pressure in a normal state (in a non-detection state where a shift operation on the shift pedal 32 is not detected). Thus, the clutch device 26 enters a standby state where the invalid filling described above has been made, which increases the responsiveness at the time of clutch coupling. In other words, when the driver increases the degree of throttle opening to increase the speed of the engine 13, coupling of the clutch device 26 immediately starts due to the supply of hydraulic pressure to the slave cylinder 28, such that the motorcycle 1 can be quickly started and accelerated.

The motorcycle 1 includes a shift operation detection switch 48 to detect the driver's shift operation on the shift pedal 32 in addition to the shift load sensor 42.

When the shift operation detection switch 48 has detected a shift operation from the first speed to neutral in the in-gear stationary state, the hydraulic pressure controller 61 performs control for setting the standby hydraulic pressure WP to a second set value P2 (a low pressure standby hydraulic pressure, see FIG. 5) lower than the first set value P1 used before the shift operation is performed.

When the transmission 21 is in an in-gear state, a standard standby hydraulic pressure corresponding to the first set value P1 is normally supplied to the slave cylinder 28, which causes a slight, so-called drag in the clutch device 26. At this time, dogs and slots (dog holes) engaging with each other in the dog clutch of the transmission 21 are pressed against each other in the rotational direction, which may cause a resistance for disengagement, making the shift operation heavy. In such a case, if the standby hydraulic pressure WP supplied to the slave cylinder 28 is lowered to a low standby hydraulic pressure corresponding to the second set value P2, the engagement between dogs and slots is easily released and the shift operation is lightened.

<Shift Operation Detection Switch>

Figure 7:
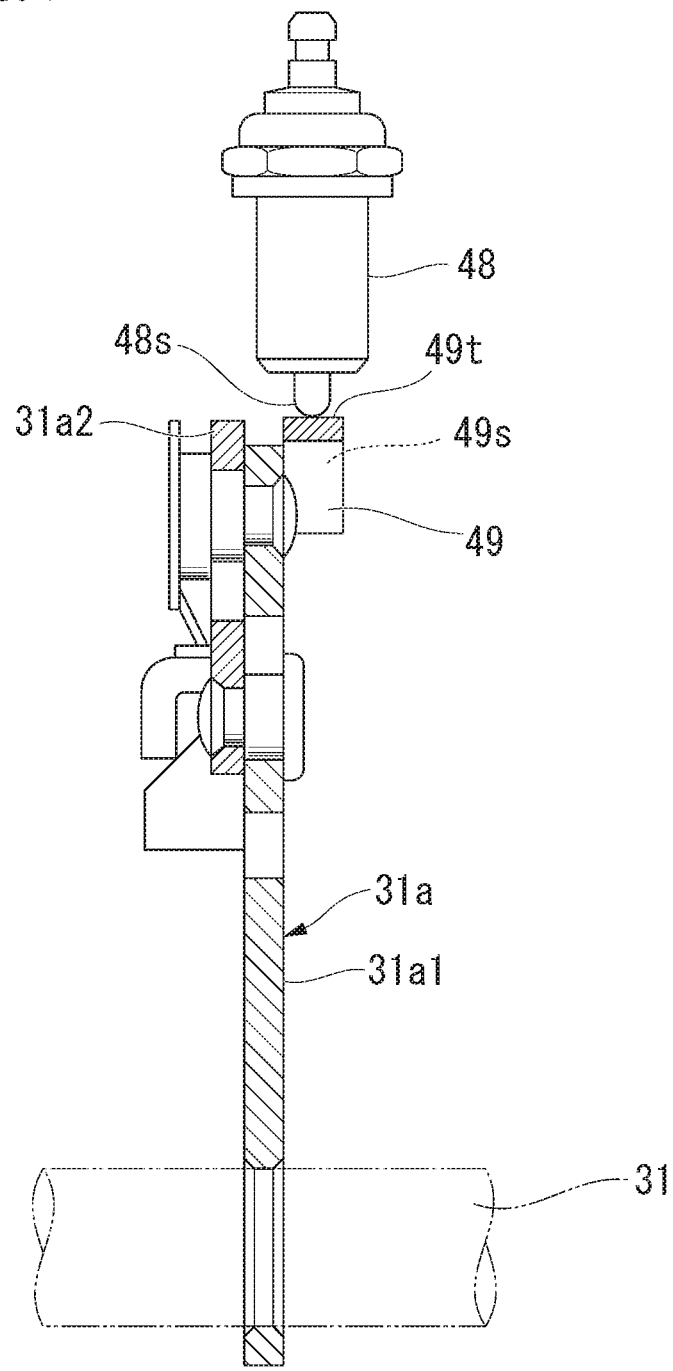
FIG. 7 is a sectional view taken along line VII-VII in FIG. 6.

As shown in FIGS. 6 and 7, the shift operation detection switch 48 is provided to face an outer peripheral end of the shift arm 31*a*, which extends radially outward from the rotation center (axial center) C1 of the shift spindle 31, in the radial direction. In FIG. 6, an arrow SUP indicates a shift-up side in the rotation direction of the shift spindle 31 and an arrow SDN indicates a shift-down side in the rotation direction of the shift spindle 31.

Referring to FIG. 6, the shift arm 31*a* extends along the extension reference line L1 that passes through the axial center C1. The shift operation detection switch 48 is supported on the transmission case 17 side and the shift arm 31*a* rotates relative to the shift operation detection switch 48.

The shift operation detection switch 48 has a cylindrical shape and a center line L2 thereof is arranged along the radial direction of the shift spindle 31. The shift operation detection switch 48 includes a detector 48*s* that strokes along the center line L2. The detector 48*s* protrudes toward a member to be detected 49 provided at the outer peripheral end of the shift arm 31*a*.

The shift arm 31*a* has a position at which the extension line of the extension reference line L1 coincides with the center line L2 of the shift operation detection switch 48 as a neutral position DE The shift arm 31*a* is biased toward the neutral position D1 by a return spring (not shown). The member to be detected 49 is provided at the outer peripheral end of the shift arm 31*a* such that the member to be detected 49 faces the shift operation detection switch 48. The member to be detected 49 has a V-shape that protrudes radially outward and is provided symmetrically with respect to the extension reference line L1. The member to be detected 49 has a protruding top portion 49*t* directed radially outward and a pair of inclined surface portions 49*s* formed on both sides, in the rotation direction of the shift spindle 31, of the protruding top portion 49*t*. The pair of inclined surface portions 49*s* are arranged substantially at right angles to each other. The protruding top portion 49*t* has a rounded chamfer with the same radius as a spherical tip surface of the detector 48*s* of the shift operation detection switch 48.

As shown in FIG. 6, the shift arm 31*a* is disposed at the neutral position D1 while no operation load acts on the shift pedal 32. At this time, the protruding top portion 49*t* of the member to be detected 49 faces the detector 48*s* of the shift operation detection switch 48 in the radial direction. This brings the detector 48*s* of the shift operation detection switch 48 into a received state, thus bringing the shift operation detection switch 48 into an on or off state (an on state in the figure).

Figure 8:
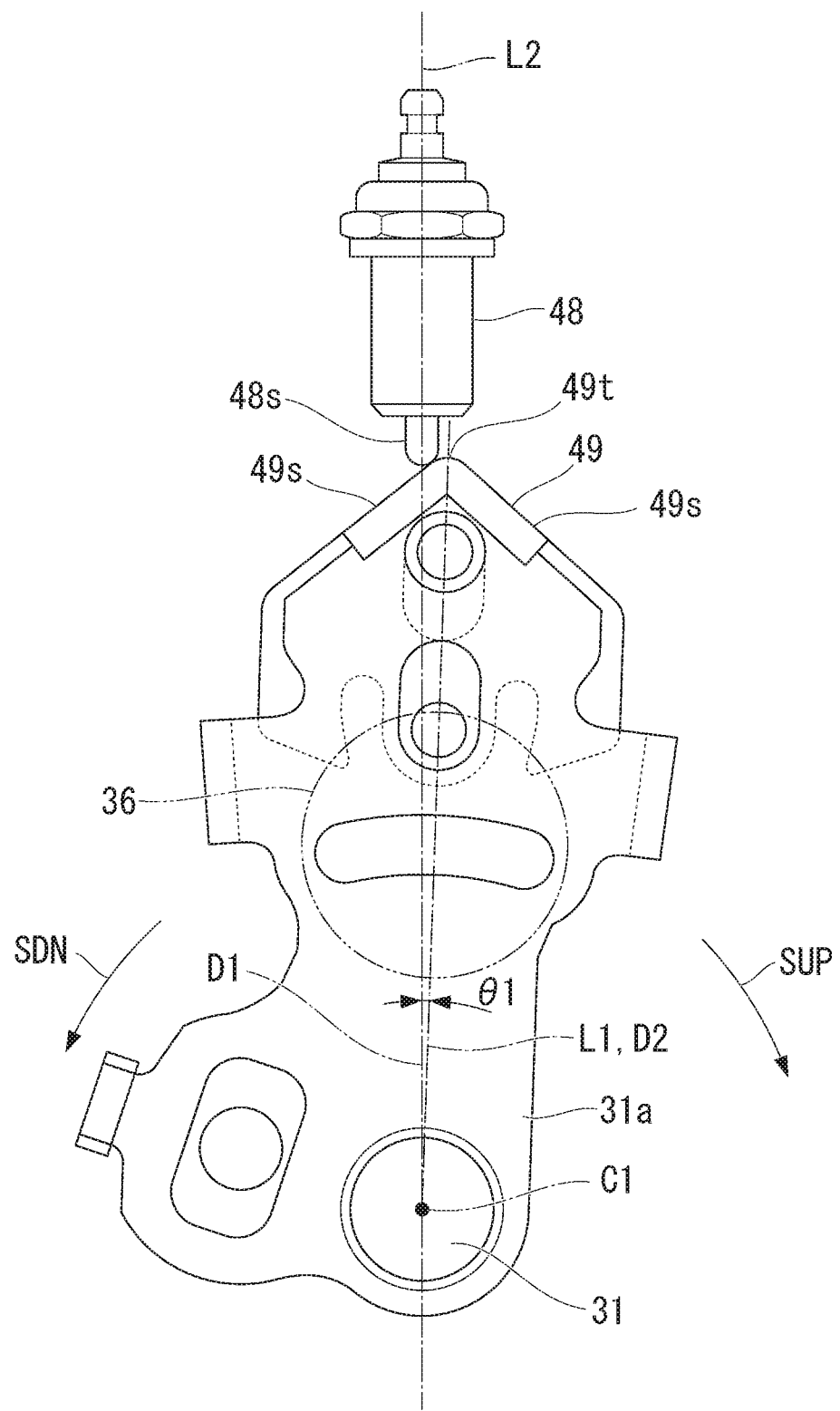
FIG. 8 is a front view corresponding to FIG. 6 in a state where the shift operation detection switch has detected a shift operation.

On the other hand, when an operation load acts on the shift pedal 32 and the shift spindle 31 rotates, the shift arm 31*a* also rotates integrally as shown in FIG. 8. In FIG. 8, the shift spindle 31 and the shift arm 31*a* rotate to the shift-up side. When the shift arm 31*a* rotates, the protruding top portion 49*t* of the member to be detected 49 is displaced in the circumferential direction with respect to the detector 48*s* of the shift operation detection switch 48. Then, the detector 48*s* changes to a protruding state while being in sliding contact with one of the pair of inclined surface portions 49*s* to switch on and off states of the shift operation detection switch 48. Thereby, the ECU 60 detects the rotation from the neutral position D1 of the shift spindle 31, that is, the shift operation on the shift pedal 32. The rotational position (shift operation detection position) D2 of the shift arm 31*a* at this time is a position at which it is rotated from the neutral position D1 through a small angle θ1 of 2 to 3 degrees.

It has been described with reference to FIGS. 6 and 8 that on and off states are detected such that the on state is detected when the detector 48*s* is received and the off state is detected when the detector 48*s* is protruded. However, the on and off states may also be detected such that the on state is detected when the detector 48*s* is in contact with the inclined surface portion 49*s* and the off state is detected when the detector 48*s* is not in contact with the inclined surface portion 49*s*.

By providing the member to be detected 49 having the protruding top portion 49*t* at the outer peripheral end of the shift arm 31*a* that extends to the outer peripheral side from the shift spindle 31 as described above, the shift operation detection switch 48 detects a slight rotation of the shift spindle 31 due to a shift operation of the shift pedal 32 with high sensitivity. Further, detection of a shift operation from the rotational position of the shift arm 31*a* fixed to the shift spindle 31 also enables highly sensitive detection as compared to when a shift operation is detected from the shift operation load. Furthermore, a shift operation can be detected more directly as compared to when a displacement of an operating member (such as the shift drum 36) which is separated from the shift spindle 31 is detected.

<Learning Control>

Figure 9:
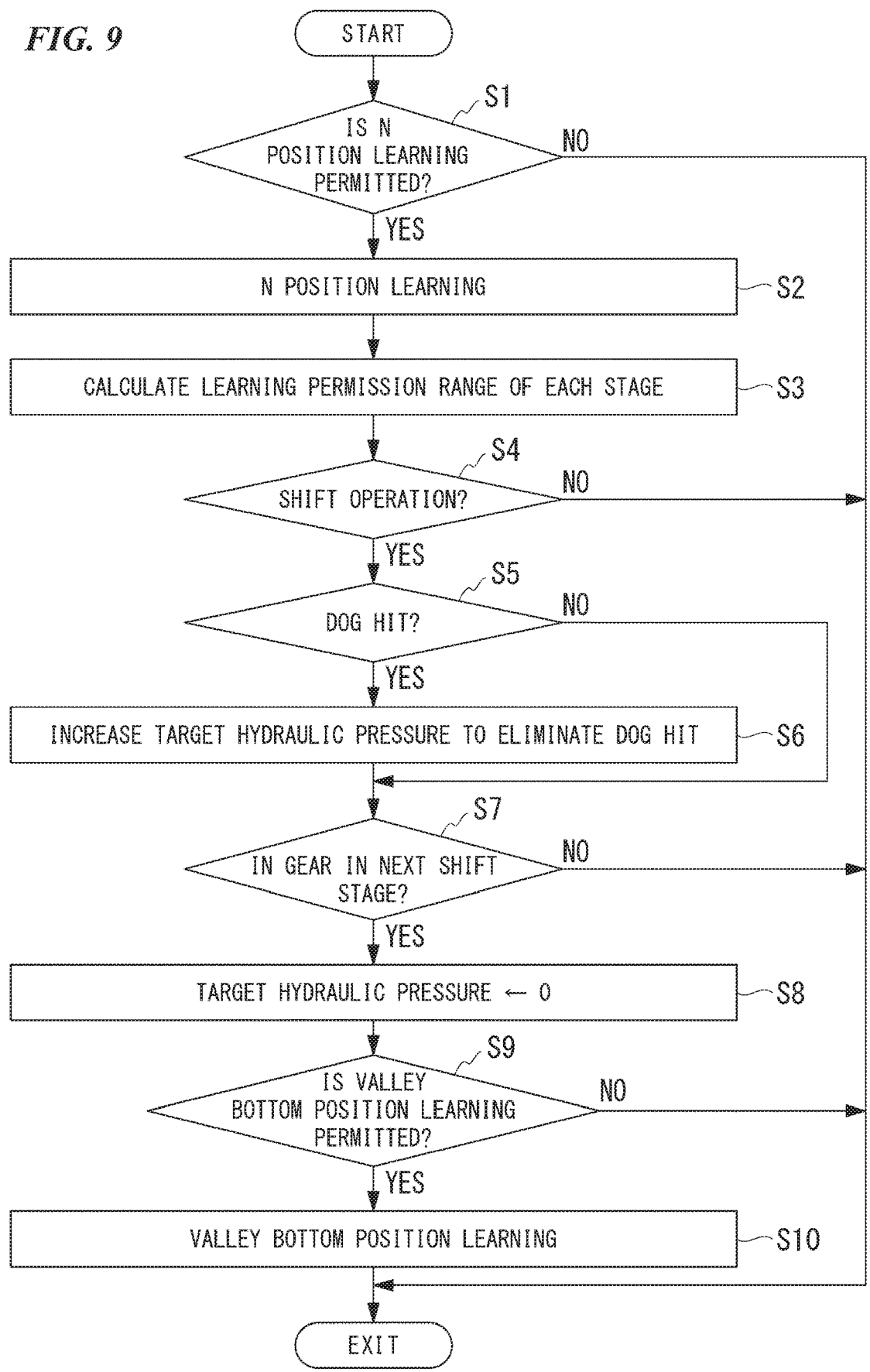
FIG. 9 is a flowchart showing a control flow when detecting a valley bottom position of a shift drum plate in a learning mode.

Next, an example of a process that the ECU 60 performs during learning control of the valley bottom position will be described with reference to a flowchart of FIG. 9. A control flow shown in FIG. 9 is repeatedly executed at a prescribed control cycle (of 1 to 10 msec) when the vehicle speed is in a stationary state where the vehicle speed is less than a predetermined set value.

First, the ECU 60 determines whether or not to permit learning of the neutral position (step S1). For example, the ECU 60 permits learning of the neutral position by switching to the learning mode with the changeover switch 59 when the engine is started and stopped (idle) (YES in step S1). When the engine is stopped or not stationary or when the changeover switch 59 remains in the normal mode, the process is temporarily terminated without shifting to the learning control (NO in step S1).

Upon permitting learning of the neutral position in step S1, the ECU 60 learns and stores the neutral position from the rotational position of the shift drum 36 (step S2).

Next, the ECU 60 calculates and determines a learning permission range of the valley bottom position of each shift stage on the basis of the learned neutral position (step S3). This learning permission range is used as the "predetermined range" described above in determining whether or not the rotation angle of the shift drum 36 with respect to the neutral position is within the predetermined range from the designed rotation angle of each shift stage as described above.

Next, the ECU 60 determines whether or not a shift operation to the first speed has been performed (step S4). The transmission 21 of the present embodiment is a return-type six stage transmission. Referring to FIGS. 6 and 7, the transmission 21 shifts to the first speed with one reciprocating movement of the shift spindle 31 toward the shift-down side indicated by the arrow SDN with reference to its position when the shift drum 36 is in the neutral position and shifts sequentially from the second to sixth speeds one by one with each repeating reciprocating movement toward the shift-up side indicated by the arrow SUP. If YES in step S4 (a shift operation has been performed), the process proceeds to step S5. If NO in step S4 (no shift operation has been performed), the process is temporarily terminated.

In step S5, the ECU 60 determines presence or absence of a dog hit. In this determination, the ECU 60 determines that a dog hit has occurred if the shift drum angle stops changing during the shift operation before reaching a predetermined angle corresponding to a shift change as in a region J shown in FIG. 11.

If a dog hit has occurred (YES in step S5), the process proceeds to step S6 to increase the target hydraulic pressure to eliminate the dog hit. For example, the ECU 60 increases the clutch hydraulic pressure to the standby hydraulic pressure WP+α in a region K shown in FIG. 11 such that the clutch capacity is increased to eliminate the dog hit. If no dog hit has occurred (NO in step S5) and if a dog hit has been eliminated in step S6, the process proceeds to step S7.

In step S7, the ECU 60 determines whether or not the transmission 21 has become in gear in the next shift stage after the shift change. In this determination, the ECU 60 determines that the transmission 21 has become in gear in the next shift stage if the change in the shift drum angle during the shift operation falls within the "predetermined range" described above from the predetermined angle corresponding to the shift change as in the region L shown in FIG. 11. If YES in step S7 (in gear in the next stage), the process proceeds to step S8. If NO in step S7 (not in gear in the next stage), the process is temporarily terminated.

In step S8, the ECU 60 sets the hydraulic pressure supplied to the clutch device 26 to be less than or less than or equal to the first hydraulic pressure value (the learning hydraulic pressure value PS1). This brings the clutch device 26 into a disconnected stage such that the rotational position of the shift drum 36 is determined only by the bias force of the stopper roller 39b of the rotational position defining mechanism 39K. Here, a rotational position of the shift drum 36 when the stopper roller 39b is pressed against and engaged with a valley bottom 38b of the shift drum plate 38 with the load applied to the shift drum 36 in the rotational direction being only the bias force of the rotational position defining mechanism 39K is referred to as a regular in-gear position or a valley bottom position.

Next, the ECU 60 determines whether or not to permit learning of the valley bottom position of the shift drum 36 (step S9). This determination will be described later with reference to FIG. 10.

If YES in step S9 (learning of the valley bottom position is permitted), the ECU 60 learns and stores the rotation angle of the shift drum 36 as the valley bottom position of the first speed and the process is temporarily terminated (step S10). If NO in step S9 (the learning of the valley bottom position is not permitted), the process is temporarily terminated.

Figure 10:
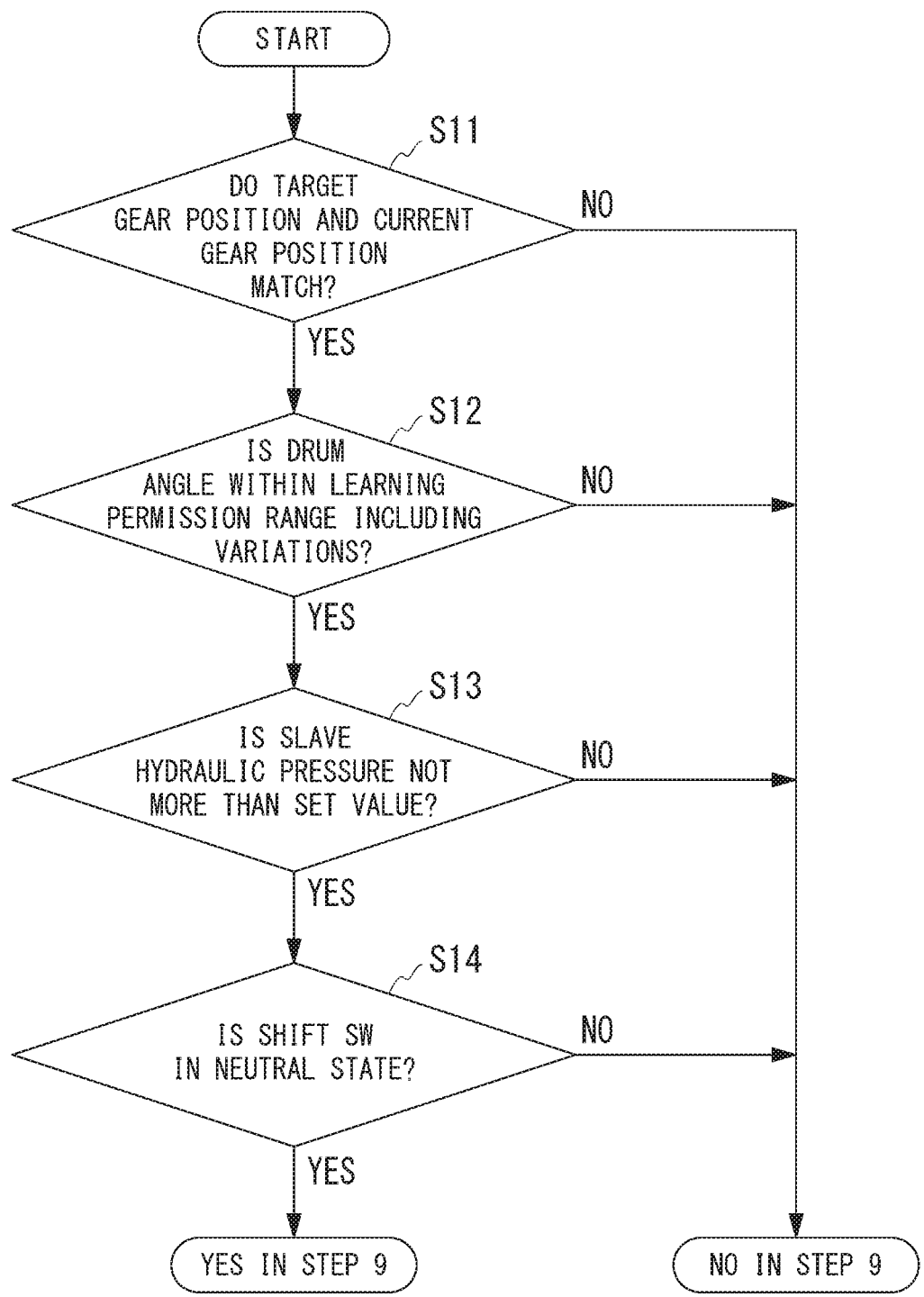
FIG. 10 is a flowchart showing a control flow of an AND condition in step S9 of FIG. 9.

A process for determining whether or not to permit learning of the valley bottom position in step S9 will be described below with reference to FIG. 10.

First, the ECU 60 determines whether or not the target gear position matches the current gear position (step S11). If both gear positions match (YES in step S11), the process proceeds to step S12. If both gear positions do not match (NO in step S11), the determination in step S9 is NO.

Here, target gear positions are preset in the order of learning of the valley bottom positions of shift stages. In the present embodiment, after learning the neutral position, a target gear position is set in the order from that of the first speed to that of the sixth speed. That is, the target gear position is updated with that of the first speed after learning the neutral position and updated with that of the second speed after learning the gear position of the first speed. The current gear position is that detected by the gear position sensor 41.

Use of the matching between the target gear position and the current gear position as a condition for determination prevents erroneous learning of the current gear position.

Next, the ECU 60 determines whether or not the rotation angle of the shift drum 36 is within a learning permission range including variations (step S12). If the rotation angle of the shift drum 36 is within the range (YES in step S12), the process proceeds to step S13. If the rotation angle of the shift drum 36 is not within the range (NO in step S12), the determination in step S9 is NO. From the determination based on the actual rotation angle of the shift drum 36, it is reliably detected that no dog hit or the like has occurred in the transmission 21.

Next, the ECU 60 determines whether or not the slave hydraulic pressure is not more than a set value (the learning hydraulic pressure value PS1) (step S13). If the slave hydraulic pressure is not more than the set value (YES in step S13), the process proceeds to step S14. If the slave hydraulic pressure is more than the set value (NO in step S13), the determination in step S9 is NO. As shown in the graph of FIG. 11, a valley bottom learning permission flag is set when both the slave hydraulic pressure and the master hydraulic pressure are lower than the set value and learning of the valley bottom is permitted on the condition that the hydraulic pressure for clutch control is sufficiently lowered.

Next, the ECU 60 determines whether or not the shift-to-neutral switch is in a neutral state (whether or not the shift arm 31a is in the neutral position D1) (step S14). If the shift-to-neutral switch is in the neutral state (YES in step S14), the determination in step S9 is YES. If the shift-to-neutral switch is not in the neutral state (NO in step S14), the determination in step S9 is NO. For example, the rotational position of the shift drum 36 may move from the valley bottom position when a low shift load has been applied such as in a state where a light foot is placed on the shift pedal 32. The shift load sensor 42 may not be able to detect such a low shift load. However, use of the shift-to-neutral switch that detects the movement of the shift arm 31a linked to the shift pedal 32 prevents erroneous learning of the valley bottom position.

After learning the valley bottom position of the gear position of the first speed, the ECU 60 sets the target gear position to that of the second speed and repeats steps S4 to S10. After learning the valley bottom position up to the gear position of the sixth speed, the ECU 60 returns, for example, the clutch hydraulic pressure to about the standby hydraulic pressure WP−α and terminates the learning control. At this time, a notification of the termination of learning control may be provided to the outside by means such as a lamp or a buzzer.

As described above, the gear-position learning device for the automatic clutch transmission of the above embodiment includes the transmission 21 configured to be shifted by an operation of a driver of the motorcycle 1, the clutch device 26 disposed in a transmission path between the transmission 21 and an engine 13 and configured to be connected and disconnected by actuation of the clutch actuator 50, the ECU 60 configured to control connection and disconnection of the clutch device 26 performed by the clutch actuator 50, the shift drum 36 configured to rotate according to a shift operation of the driver performed on the shift pedal 32 and switch the shift stage of the transmission 21, and the rotational position defining mechanism 39K configured to define a rotational position of the shift drum 36, wherein the ECU 60 has a learning mode for learning a rotation angle of the shift drum 36 and is configured to control connection and disconnection of the clutch device 26 during the learning mode such that the shift drum 36 is at a rotational position determined by the rotational position defining mechanism 39K.

According to this configuration, the rotation angle of the shift drum 36 mechanically determined by the rotational position defining mechanism 39K during the learning mode for learning the rotation angle of the shift drum 36 for switching the shift stage can be stored. That is, in the learning mode, connection and disconnection of the clutch device 26 is controlled and the clutch device 26 is disconnected after avoiding, for example, a dog hit occurring in the transmission 21, whereby the rotational position of the shift drum 36 can be mechanically determined by the rotational position defining mechanism 39K. Therefore, highly accurate in-gear position learning can be performed.

The present invention is not limited to the above embodiment. For example, the shift operator is not limited to a shift pedal that is operated with a foot and may be a lever that is operated with a hand or the like. An actuator that is electrically driven to perform a shift operation may also be provided therebetween.

The present invention is not limited to application in the saddle-ride type vehicle in which a clutch operation is automated as in the above embodiment and is also applicable to a saddle-ride type vehicle including a so-called clutchless transmission device which basically uses a manual clutch operation while adjusting the drive power to enable gear shift without a manual clutch operation performed under a predetermined condition.

For example, an indicator (information output unit) that notifies the surroundings of the learning mode may be provided on a meter device or the like in the vicinity of the steering handle 4a. The indicator is, for example, a lamp and lights or blinks during the learning mode. The indicator outputs information indicating the learning mode to a worker or the like around the vehicle.

Saddle-ride type vehicles include any vehicle on which a driver rides across a vehicle body and includes not only motorcycles (including motorbikes and scooter type vehicles) but also three-wheelers (including vehicles with one front wheel and two rear wheels and vehicles with two front wheels and one rear wheel) or four-wheel vehicles, and also include vehicles including an electric motor as a prime mover.

The configurations of the above embodiment are examples of the present invention and various changes can be made without departing from the gist of the invention.

REFERENCE SIGNS LIST

1 Motorcycle (saddle-ride type vehicle)
13 Engine (prime mover)
17 Transmission case
21 Transmission
26 Clutch device
31a Shift arm (master arm)
32 Shift pedal (shift operator)
36 Shift drum
38 Shift drum plate
38b Valley bottom
38d Top portion
39b Stopper roller (stopper)
39K Rotational position defining mechanism
41 Gear position sensor
50 Clutch actuator
59 Changeover switch
60 ECU (controller)
PS1 Learning hydraulic pressure value (first hydraulic pressure value)
PS2 Shift hydraulic pressure value (second hydraulic pressure value)
D1 Neutral position

What is claim is:

1. A gear-position learning device for an automatic clutch transmission, comprising:
    a transmission configured to be shifted by an operation of a driver of a vehicle;
    a clutch device disposed in a transmission path between the transmission and an engine and configured to be connected and disconnected by actuation of a clutch actuator;
    a controller configured to control connection and disconnection of the clutch device performed by the clutch actuator;
    a shift drum configured to rotate according to a shift operation that the driver performs on a shift operator and switch a shift stage of the transmission; and
    a rotational position defining mechanism configured to define a rotational position of the shift drum,
    wherein the controller has a learning mode for learning a rotation angle of the shift drum and is configured to control connection and disconnection of the clutch device during the learning mode such that the shift drum is at a rotational position determined by the rotational position defining mechanism.

2. The gear-position learning device for the automatic clutch transmission according to claim 1, wherein the clutch device is a hydraulic clutch configured to be brought into a connected state when hydraulic pressure is supplied thereto, the rotational position defining mechanism includes:
    a shift drum plate configured to be rotatable coaxially and integrally with the shift drum and having on an outer periphery thereof a plurality of valley bottoms that define rotational positions of the shift drum; and
    a stopper supported by a transmission case that supports the shift drum and configured to engage with the valley bottom of the shift drum plate in a biased state to define a rotational position of the shift drum,
    wherein the controller is configured to reduce a hydraulic pressure of the clutch device when the stopper has passed over a top portion between adjacent valley bottoms such that the stopper is positioned at the valley bottom of the shift drum plate and learn the rotation angle of the shift drum in a state where the shift drum is at the rotational position determined by the rotational position defining mechanism during the learning mode.

3. The gear-position learning device for the automatic clutch transmission according to claim 2, wherein the controller is configured to set the hydraulic pressure of the clutch device to be less than or equal to a predetermined first hydraulic pressure value when the stopper moves from the top portion of the shift drum plate toward the valley bottom during the learning mode.

4. The gear-position learning device for the automatic clutch transmission according to claim 3, wherein the controller is configured to permit learning of the rotation angle of the shift drum when the hydraulic pressure of the clutch device is set to be less than or equal to the first hydraulic pressure value during the learning mode.

5. The gear-position learning device for the automatic clutch transmission according to claim 2, wherein the controller is configured to set the hydraulic pressure of the clutch device to a value that is more than or equal to a predetermined second hydraulic pressure value when the stopper moves from the valley bottom to the top portion of the shift drum plate during the learning mode.

6. The gear-position learning device for the automatic clutch transmission according to claim 5, wherein the controller is configured to maintain a state where the hydraulic pressure of the clutch device is set to a value that is more than or equal to the second hydraulic pressure value until the stopper passes over the top portion of the shift drum plate during the learning mode.

7. The gear-position learning device for the automatic clutch transmission according to claim 1, further comprising a master arm connected to the shift operator and configured to move from a neutral position and rotate the shift drum by a shift operation performed on the shift operator,
wherein the controller is configured to permit learning of the rotation angle of the shift drum upon detecting that the master arm is in the neutral position during the learning mode.

8. The gear-position learning device for the automatic clutch transmission according to claim 1, wherein the controller is configured to permit learning of the rotation angle of the shift drum when the rotation angle of the shift drum is within a predetermined range during the learning mode.

9. The gear-position learning device for the automatic clutch transmission according to claim 1, further comprising a gear position sensor configured to detect a gear position from the rotational position of the shift drum,
wherein the controller is configured to permit learning of the rotation angle of the shift drum when the gear position detected by the gear position sensor matches a predetermined target gear position during the learning mode.

10. The gear-position learning device for the automatic clutch transmission according to claim 1, further comprising a changeover switch configured to switch the controller from a normal mode to the learning mode.

* * * * *